US012670171B2

(12) United States Patent (10) Patent No.: US 12,670,171 B2
Gould et al. (45) Date of Patent: Jun. 30, 2026

(54) BACK-CALCULATION OF AGGREGATES

(71) Applicant: Ab Initio Technology LLC, Lexington, MA (US)

(72) Inventors: Joel Gould, Arlington, MA (US); Benjamin James Robbie Roche, London (GB)

(73) Assignee: Ab Initio Technology LLC, Lexington, MA (US)

( * ) Notice: Subject to any disclaimer, the term of this patent is extended or adjusted under 35 U.S.C. 154(b) by 53 days.

(21) Appl. No.: 18/233,418

(22) Filed: Aug. 14, 2023

(65) Prior Publication Data

US 2024/0265023 A1 Aug. 8, 2024

Related U.S. Application Data

(60) Provisional application No. 63/443,515, filed on Feb. 6, 2023.

(51) Int. Cl.
*G06F 16/20* (2019.01)
*G06F 16/242* (2019.01)
*G06F 16/2458* (2019.01)

(52) U.S. Cl.
CPC ........ *G06F 16/2474* (2019.01); *G06F 16/244* (2019.01)

(58) Field of Classification Search
CPC ........................... G06F 16/2474; G06F 16/244
See application file for complete search history.

(56) References Cited

U.S. PATENT DOCUMENTS

| | | | |
|---|---|---|---|
| 5,966,072 A | 10/1999 | Stanfill et al. | |
| 7,908,076 B2 | 3/2011 | Downs et al. | |
| 9,454,578 B2 | 9/2016 | Anzalone et al. | |
| 9,817,561 B2 | 11/2017 | Mital et al. | |
| 9,892,020 B1 * | 2/2018 | Ophir ............... | G06F 16/24568 |
| 9,959,267 B2 | 5/2018 | Folting et al. | |
| 10,122,783 B2 | 11/2018 | Qiao et al. | |
| 10,831,509 B2 | 11/2020 | Ravid et al. | |
| 11,210,285 B2 | 12/2021 | Egenolf et al. | |
| 11,281,673 B2 | 3/2022 | Nanda et al. | |
| 2008/0082959 A1 | 4/2008 | Fowler | |
| 2010/0185618 A1 | 7/2010 | Peterson | |
| 2017/0177446 A1 | 6/2017 | MacLean et al. | |
| 2017/0371926 A1 | 12/2017 | Shiran et al. | |
| 2019/0130048 A1 | 5/2019 | Egenolf et al. | |
| 2021/0004244 A1 | 1/2021 | Ravid et al. | |
| 2021/0365324 A1 | 11/2021 | Wang et al. | |

(Continued)

OTHER PUBLICATIONS

Broadcom.com [online], "Adding/Modifying Virtual Fields," Sep. 26, 2023, retrieved from URL<https://techdocs.broadcom.com/us/en/ca-enterprise-software/it-operations-management/ca-2e/8-7/defining-ca-2e-data-models/maintaining-your-data-model/adding-modifying-virtual-fields.html>, 3 pages.

(Continued)

*Primary Examiner* — Kristopher Andersen

(74) *Attorney, Agent, or Firm* — Fish & Richardson P.C.

(57) ABSTRACT

Described are techniques for back-calculating one or more values of a new, real-time aggregate before sufficient data to calculate the new, real-time aggregate has been collected, wherein the back-calculating is based on data collected for one or more aggregates that have been executing prior to start of execution of the new, real-time aggregate.

20 Claims, 20 Drawing Sheets

(56) References Cited

U.S. PATENT DOCUMENTS

2021/0374109 A1    12/2021    Shimanovsky et al.
2022/0004561 A1    1/2022    Sherman

OTHER PUBLICATIONS

Dreamio.awsworkshop.io [online], "Amazon—Editing a Virtual Dataset," retrieved on or before May 26, 2022, retrieved from URL<https://dremio.awsworkshop.io/50-create-virtual-datasets/504-edit-vitual-dataset.html>, 3 pages.

Infocepts [online], "Achieve Real-Time Data Analysis with a Virtual Data Warehouse," Jan. 19, 2016, retrieved from URL<https://www.infocepts.com/blog/achieve-real-time-data-analysis-with-avirtual-data-warehouse/>, 6 pages.

Informatica.com [online], "Creating an External Resource for the Aggregate View," Jan. 2023, retrieved from URL<https://docs.informatica.com/master-data-management/customer-360/10-3/installation-and-configuration-guide/after-you-install/integrating-informatica-mdm---relate-360/creating-an-external-resource-for-the-aggregate-view.html>, 3 pages.

International Search Report and Written Opinion in International Appln. No. PCT/US2024/014447, mailed on Jun. 5, 2024, 15 pages.

Rockset.com [online], "Real-Time Analytics in the World of Virtual Reality and Live Streaming," Sep. 6, 2019, retrieved from URL<https://rockset.com/blog/real-time-analytics-virtual-reality-live-streaming/>, 10 pages.

Segment.com [online], "Create real-time audiences (campaigns, lookalikes, ad suppression, etc.)," retrieved on Aug. 22, 2023, retrieved from URL<https://segment.com/use-cases/create-real-time-audiences/>, 7 pages.

Setiadji et al., "Development of Back-calculation Model for Aggregate Gradation Determination Using Fractal Theory," MATEC Web of Conferences, Mar. 30, 2018, 159(01006):1-6.

Splunk.com [online], "Stream Processor Service: Function Reference," retrieved on Jun. 9, 2022, retrieved from URL<www.splunk.com>, 5 pages.

Tibco.com [online], "Aggregating Data," retrieved on May 25, 2022, retrieved from URL<https://docs.tibco.com/pub/spotfire_server/10.6.1/doc/html/en-US/TIB_sfire_bauthorconsumer_usersguide/GUID-B8AB864D-7472-4B92-BD4E-00F508AC8FE2.html>, 3 pages.

Tibco.com online, "Anything 360," retrieved on Aug. 22, 2023, retrieved from URL<https://www.tibco.com/solutions/anything-360>, 6 pages.

TowardsDataScience.com online, "The Anatomy of an Active Metadata Platform," Aug. 12, 2021, retrieved on Aug. 22, 2023, retrieved from URL<https://towardsdatascience.com/the-anatomy-of-an-active-metadata-platform-1347309 1ad0d>, 18 pages.

International Preliminary Report on Patentability in International Appln. No. PCT/US2024/014447, mailed on Aug. 21, 2025, 10 pages.

* cited by examiner

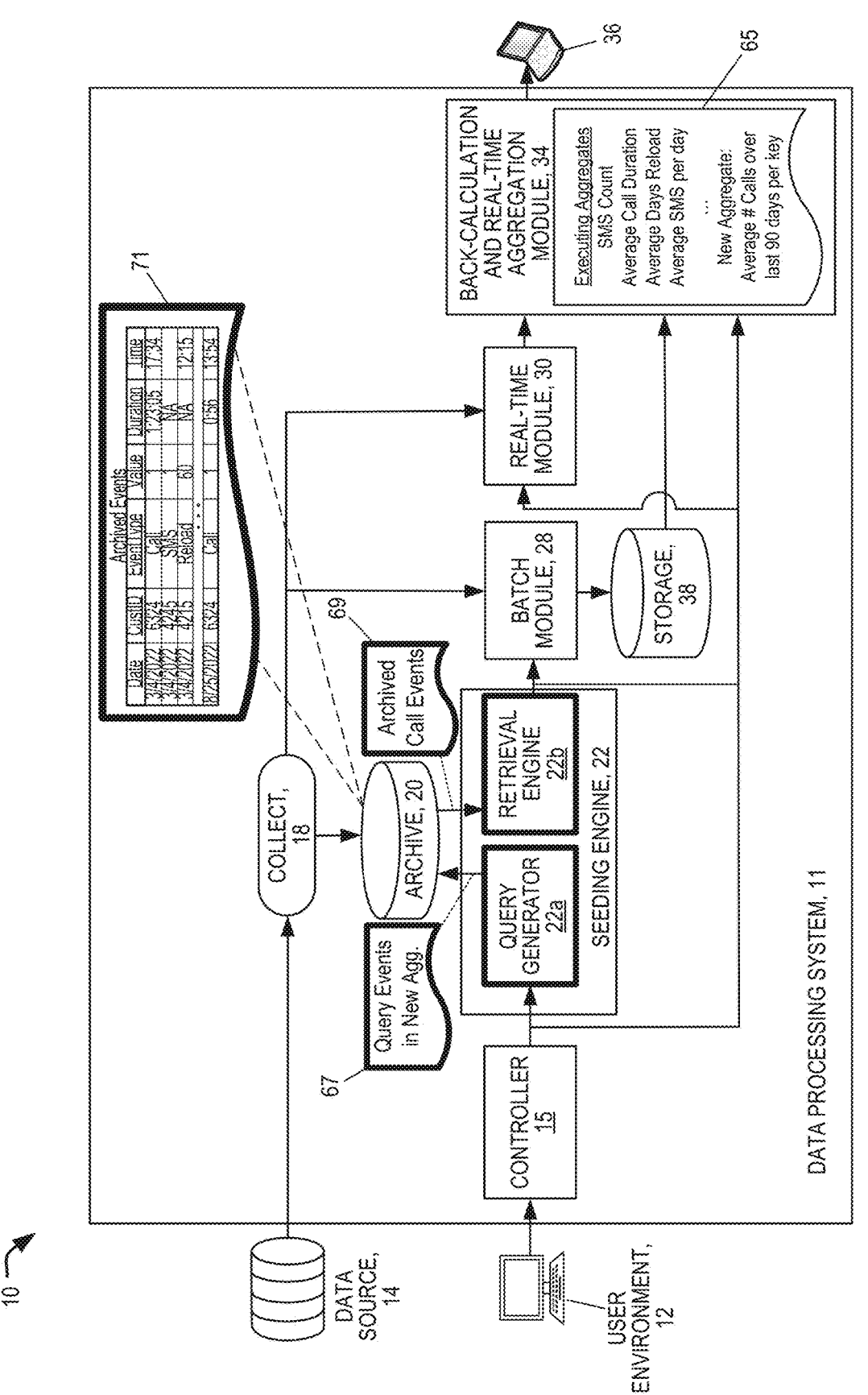

Archived Events 71

| Date | CustID | EventType | Value | Duration | Time |
|------|--------|-----------|-------|----------|------|
| 3/4/2022 | 324 | Call | | 12:45 | 17:34 |
| 3/4/2022 | 245 | SMS | 60 | NA | 12:15 |
| 3/4/2022 | 215 | Reload | 1 | | |
| 8/25/2022 | 6324 | Call | | 0:36 | 13:54 |

DATA SOURCE, 14

USER ENVIRONMENT, 12

CONTROLLER 15

Query Events in New Agg. 67

QUERY GENERATOR 22a

RETRIEVAL ENGINE 22b

Archived Call Events 69

SEEDING ENGINE, 22

COLLECT, 18

ARCHIVE, 20

BATCH MODULE, 28

STORAGE, 38

REAL-TIME MODULE, 30

BACK-CALCULATION AND REAL-TIME AGGREGATION MODULE, 34

Executing Aggregates
SMS Count
Average Call Duration
Average Days Reload
Average SMS per day New Aggregate:
Average # Calls over last 90 days per key

65

36

DATA PROCESSING SYSTEM, 11

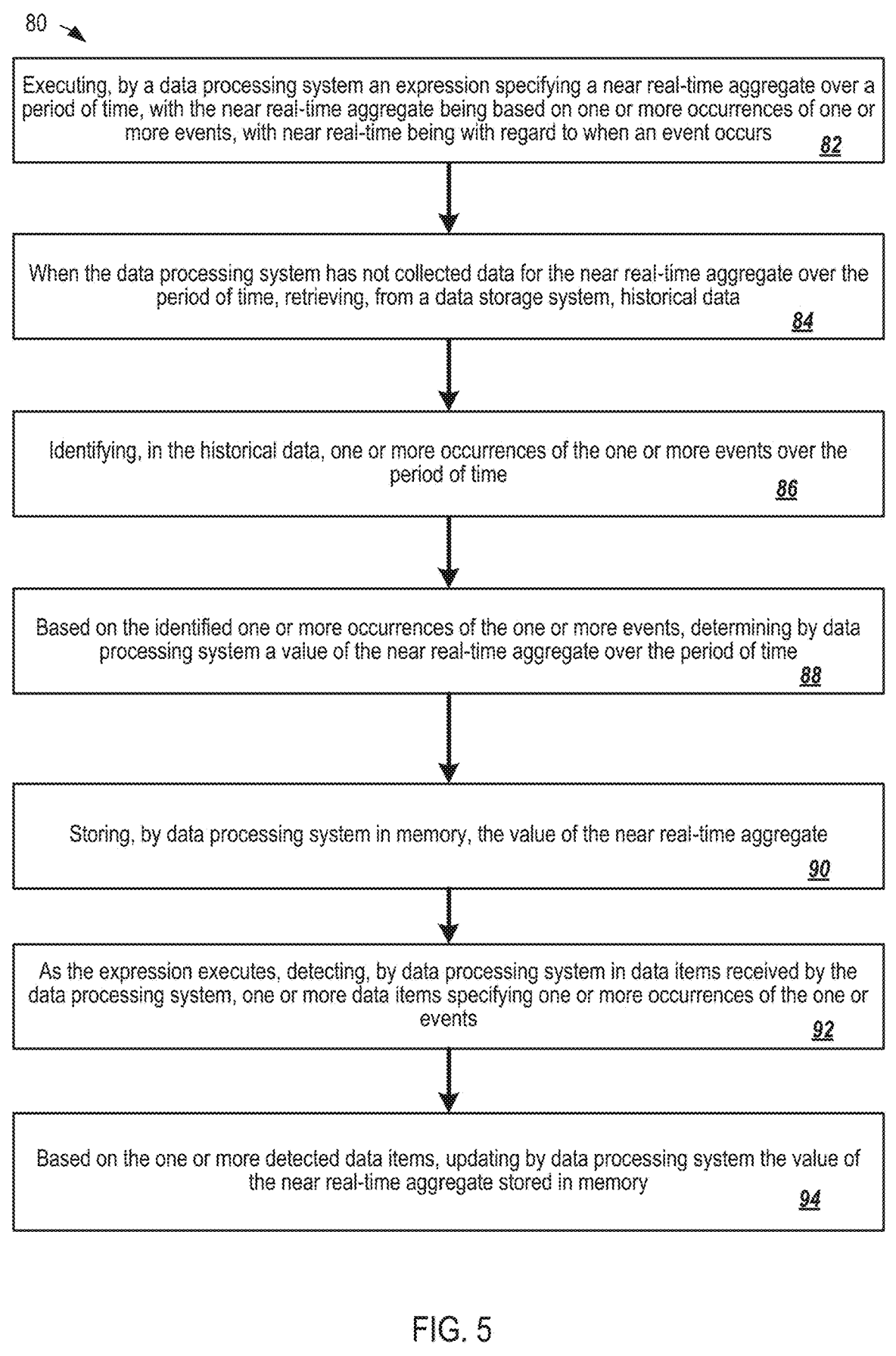

Executing, by a data processing system an expression specifying a near real-time aggregate over a period of time, with the near real-time aggregate being based on one or more occurrences of one or more events, with near real-time being with regard to when an event occurs    82

Executing, by a data processing system an expression specifying a near real-time aggregate over a period of time, with the near real-time aggregate being based on one or more occurrences of one or more events, with near real-time being with regard to when an event occurs    82

When the data processing system has not collected data for the near real-time aggregate over the period of time, retrieving, from a data storage system, historical data    84

Identifying, in the historical data, one or more occurrences of the one or more events over the period of time    86

Based on the identified one or more occurrences of the one or more events, determining by data processing system a value of the near real-time aggregate over the period of time    88

Storing, by data processing system in memory, the value of the near real-time aggregate    90

As the expression executes, detecting, by data processing system in data items received by the data processing system, one or more data items specifying one or more occurrences of the one or events    92

Based on the one or more detected data items, updating by data processing system the value of the near real-time aggregate stored in memory    94

FIG. 5

BACK-CALCULATION OF AGGREGATES

CLAIM OF PRIORITY

This application claims priority under 35 U.S.C. § 119(e) to U.S. Patent Application Ser. No. 63/443,515, filed on Feb. 6, 2023, the entire contents of which are hereby incorporated by reference.

BACKGROUND

This disclosure relates to techniques for efficiently operating a data processing system with a large number of datasets that may be stored in any of a large number of data stores.

Modern data processing systems manage vast amounts of data within an enterprise. A large institution, for example, may have millions of datasets. These data can support multiple aspects of the operation of the enterprise. Complex data processing systems typically process data in multiple stages, with the results produced by one stage being fed into the next stage. The overall flow of information through such systems may be described in terms of a directed dataflow graph, with nodes or vertices in the graph representing components (either data files or processes), and the links or "edges" in the graph indicating flows of data between the components. A system for executing such graph-based computations is described in prior U.S. Pat. No. 5,966,072, titled "Executing Computations Expressed as Graphs," incorporated herein by reference.

Graphs also can be used to invoke computations directly. Graphs made in accordance with this system provide methods for getting information into and out of individual processes represented by graph components, for moving information between the processes, and for defining a running order for the processes. Systems that invoke these graphs include algorithms that choose inter-process communication methods and algorithms that schedule process execution, and also provide for monitoring of the execution of the dataflow graph.

To support a wide range of functions, a data processing system may execute applications, whether to implement routine processes or to extract insights from the datasets. The applications may be programmed to access the data stores to read and write data.

SUMMARY

In a general aspect 1, described is a method implemented by a data processing system for back-calculating one or more values of a new, real-time aggregate before sufficient data to calculate the new, real-time aggregate has been collected, wherein the back-calculating is based on data collected for one or more aggregates that have been executing prior to start of execution of the new, real-time aggregate, the method including: executing, by a data processing system, an expression specifying a near real-time aggregate over a period of time, with the near real-time aggregate being based on one or more occurrences of one or more events, with near real-time being with regard to when an event occurs; when the data processing system has not collected data for the near real-time aggregate over a portion of the period of time, retrieving, from a data storage system, historical data; identifying, in the historical data, one or more occurrences of the one or more events over the portion of the period of time; based on the identified one or more occurrences of the one or more events, determining a value of the near real-time aggregate over the period of time; storing, in memory, the value of the near real-time aggregate; as the expression executes, detecting, in data items received by the data processing system, one or more data items specifying one or more occurrences of the one or more events; and based on the one or more detected data items, updating the value of the near real-time aggregate stored in memory in accordance with the expression.

In an aspect 2 according to aspect 1, further including: generating a query to retrieve from an archive the historical data.

In an aspect 3 according to any one of aspects 1 to 2, further including: sending the historical data to a batch processing module.

In an aspect 4 according to any one of aspects 1 to 3, further including: sending the occurrences of one or more events to a real-time processing module.

In an aspect 5 according to any one of aspects 1 to 4, wherein as the expression executes for a given day, decrementing one day's worth of historical data, and incrementing one day's worth of the occurrences of one or more events.

In an aspect 6 according to any one of aspects 1 to 5, wherein the query includes a search key.

In an aspect 7 according to any one of aspects 1 to 6, wherein the search key is a customer identifier.

In an aspect 8 according to any one of aspects 1 to 7, wherein a collect module outputs to a batch module of an aggregate that is based on a given number of days of archived events and the batch module.

In an aspect 9 according to any one of aspects 1 to 8, wherein the batch module executes a computation graph that accesses the retrieved archived events, sorts the retrieved archived events according to a key, filters the sorted retrieved archived events according to the given number of days of events, and stores the given number of days of events and updates the near real-time aggregate stored in memory.

In an aspect 10 according to any one of aspects 1 to 9, wherein the retrieving, from the data storage system, of the historical data is performed by performing, once for the determining of the near real-time aggregate, batch retrieval of the historic data.

In an aspect 11 according to any one of aspects 1 to 10, wherein the data storage system is a non-volatile data storage system.

In an aspect 12 according to any one of aspects 1 to 11, wherein the memory is volatile memory.

In an aspect 13 according to any one of aspects 1 to 12, wherein the aggregate is determined by executing the expression on one or more inputs; wherein identifying the one or more occurrences in the historical data includes identifying, in the historical data, one or more items of the historical data representing one or more historical occurrences of the one or more events, with the one or more historical occurrences occurring over a historical period of time, with an amount of time specified by the historical period of time corresponding to an amount of time specified by the period of time; wherein the method further includes: inputting the identified one or more items of the historical data as the one or more inputs to the one or more operations.

In a general aspect 14, a data processing system for back-calculating one or more values of a new, real-time aggregate before sufficient data to calculate the new, real-time aggregate has been collected, wherein the back-calculating is based on data collected for one or more aggregates that have been executing prior to start of execution of the new, real-time aggregate, the data processing system including one or more processor devices and memory, with the data processing system configured to perform actions including: executing an expression specifying a near real-time aggregate over a period of time, with the near real-time aggregate being based on one or more occurrences of one or more events, with near real-time being with regard to when an event occurs; when the data processing system has not collected data for the near real-time aggregate over a portion of the period of time, retrieving, from a data storage system, historical data; identifying, in the historical data, one or more occurrences of the one or more events over the portion of the period of time; based on the identified one or more occurrences of the one or more events, determining a value of the near real-time aggregate over the period of time; storing, in the memory, the value of the near real-time aggregate; as the expression executes, detecting, in data items received by the data processing system, one or more data items specifying one or more occurrences of the one or events; and based on the one or more detected data items, updating the value of the near real-time aggregate stored in memory in accordance with the expression.

In an aspect 15 according to aspect 14, further including: generating a query to retrieve from an archive the historical data.

In an aspect 16 according to any one of aspects 14 to 15, further including: sending the historical data to a batch processing module.

In an aspect 17 according to any one of aspects 14 to 16, further including: sending the occurrences of one or more events to a real-time processing module.

In an aspect 18 according to any one of aspects 14 to 17, wherein as the expression executes for a given day, decrementing one day's worth of historical data, and incrementing one day's worth of the occurrences of one or more events.

In an aspect 19 according to any one of aspects 14 to 18, wherein the query includes a search key.

In an aspect 20 according to any one of aspects 14 to 19, wherein the search key is a customer identifier.

In an aspect 21 according to any one of aspects 14 to 20, wherein a collect module outputs to a batch module of an aggregate that is based on a given number of days of archived events and the batch module.

In an aspect 22 according to any one of aspects 14 to 21, wherein the batch module executes a computation graph that accesses the retrieved archived events, sorts the retrieved archived events according to a key, filters the sorted retrieved archived events according to the given number of days of events, and stores the given number of days of events and updates the near real-time aggregate stored in memory.

In an aspect 23 according to any one of aspects 14 to 22, wherein the retrieving, from the data storage system, of the historical data is performed by performing, once for the determining of the near real-time aggregate, batch retrieval of the historic data.

In an aspect 24 according to any one of aspects 14 to 23, wherein the data storage system is a non-volatile data storage system.

In an aspect 25 according to any one of aspects 14 to 24, wherein the memory is volatile memory.

In an aspect 26 according to any one of aspects 14 to 25, wherein the aggregate is determined by executing the expression on one or more inputs; wherein identifying the one or more occurrences in the historical data includes identifying, in the historical data, one or more items of the historical data representing one or more historical occurrences of the one or more events, with the one or more historical occurrences occurring over a historical period of time, with an amount of time specified by the historical period of time corresponding to an amount of time specified by the period of time; wherein the method further includes: inputting the identified one or more items of the historical data as the one or more inputs to the one or more operations.

In a general aspect 27, one or more non-transitory computer readable storage devices including instructions for back-calculating one or more values of a new, real-time aggregate before sufficient data to calculate the new, real-time aggregate has been collected, wherein the back-calculating is based on data collected for one or more aggregates that have been executing prior to start of execution of the new, real-time aggregate, the instructions causing a data processing system to perform actions including: executing an expression specifying a near real-time aggregate over a period of time, with the near real-time aggregate being based on one or more occurrences of one or more events, with near real-time being with regard to when an event occurs; when the data processing system has not collected data for the near real-time aggregate over a portion of the period of time, retrieving, from a data storage system, historical data; identifying, in the historical data, one or more occurrences of the one or more events over the portion of the period of time; based on the identified one or more occurrences of the one or more events, determining a value of the near real-time aggregate over the period of time; storing, in memory, the value of the near real-time aggregate; as the expression executes, detecting, in data items received by the data processing system, one or more data items specifying one or more occurrences of the one or events; and based on the one or more detected data items, updating the value of the near real-time aggregate stored in memory in accordance with the expression.

In an aspect 28 according to aspect 27, further including instructions to cause the data processing system to perform actions including: generating a query to retrieve from an archive the historical data.

In an aspect 29 according to any one of aspects 27 to 28, further including instructions to cause the data processing system to perform actions including: sending the historical data to a batch processing module.

In an aspect 30 according to any one of aspects 27 to 29, further including instructions to cause the data processing system to perform actions including: sending the occurrences of one or more events to a real-time processing module.

In an aspect 31 according to any one of aspects 27 to 30, wherein as the expression executes for a given day, decrementing one day's worth of historical data, and incrementing one day's worth of the occurrences of one or more events.

In an aspect 32 according to any one of aspects 27 to 31, wherein the query includes a search key.

In an aspect 33 according to any one of aspects 27 to 32, wherein the search key is a customer identifier.

In an aspect 34 according to any one of aspects 27 to 33, wherein a collect module outputs to a batch module of an aggregate that is based on a given number of days of archived events and the batch module.

In an aspect 35 according to any one of aspects 27 to 34, wherein the batch module executes a computation graph that accesses the retrieved archived events, sorts the retrieved archived events according to a key, filters the sorted retrieved archived events according to the given number of days of events, and stores the given number of days of events and updates the near real-time aggregate stored in memory.

In an aspect 36 according to any one of aspects 27 to 35, wherein the retrieving, from the data storage system, of the historical data is performed by performing, once for the determining of the near real-time aggregate, batch retrieval of the historic data.

In an aspect 37 according to any one of aspects 27 to 36, wherein the data storage system is a non-volatile data storage system.

In an aspect 38 according to any one of aspects 27 to 37, wherein the memory is volatile memory.

In an aspect 39 according to any one of aspects 27 to 38, wherein the aggregate is determined by executing the expression on one or more inputs; wherein identifying the one or more occurrences in the historical data includes identifying, in the historical data, one or more items of the historical data representing one or more historical occurrences of the one or more events, with the one or more historical occurrences occurring over a historical period of time, with an amount of time specified by the historical period of time corresponding to an amount of time specified by the period of time; wherein the method further includes: inputting the identified one or more items of the historical data as the one or more inputs to the one or more operations.

One or more of the above aspects may provide one or more of the following advantages.

The above aspects provide techniques executed by a data processing system for determining a value of a near real-time aggregate over a period of time, even when the data processing system has not aggregated data for the aggregate over the period of time. The data processing system executes an expression specifying a near real-time aggregate over a period of time, with the near real-time aggregate being based on one or more occurrences of one or more events, with near real-time being with regard to when an event occurs. When the data processing system has not collected data for the near real-time aggregate over the period of time, the data processing system retrieves from a data storage system historical data and identifies in the historical data, one or more occurrences of the one or more events over the period of time.

There are numerous advantages to the system described herein. Namely, the time to make data available for a new aggregate is reduced from months to minutes. Additionally, the techniques described herein are more memory efficient because already collected data (e.g., data that was collected for previously running aggregates) is reused, thus making efficient use of data that is already stored. This usage is efficient because data that is already stored and collected is being reused, rather than having to spend computing resources collecting and receiving new data. Additionally, by using a batch approach to retrieve (from disk) data that has already been collected from previously running aggregates, the system described herein only has to retrieve the data once to save computing time and resources and then that retrieved data is stored locally. This locally stored data is then updated with data collected for a newly running aggregate, without requiring another batch retrieval. The execution of a single batch retrieval, rather than doing multiple batch retrievals, improves computing resources.

Another advantage of the techniques described herein is that the system is able to back calculate values for newly executing aggregates through only the introduction of a seeding engine, as described herein. Once the system reaches steady state (e.g., the aggregate has been running for 90 days or the amount of time required for the aggregate), the system uses a batch module, real-time module, and real-time aggregation module—as described herein. In computing a back calculation for an aggregate, the system described herein uses the same batch module, real-time module, and real-time aggregation module that are used in steady state. However, to compute the back aggregate, the system described herein also uses a seeding engine in combination with the batch module, the real-time module, and the real-time aggregation module. As such, in performing the back-calculations, the system described herein is able to reuse the steady state modules—the batch module, the real-time module, and the real-time aggregation module. This reuse of the steady state modules (rather than having to implement an entirely distinct system to perform the back calculations) conserves memory resources and is computationally efficient. It is computationally efficient because there is a single, consolidated system to perform the computations (e.g., including the back computations), as opposed to two distinct systems from which data has to be merged and integrated.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 3A-3E are block diagrams of the system of FIG. 1 in various stages of computing another aggregate.

FIG. 5 is a flow diagram for computing an aggregate.

DETAILED DESCRIPTION

Figure 1:
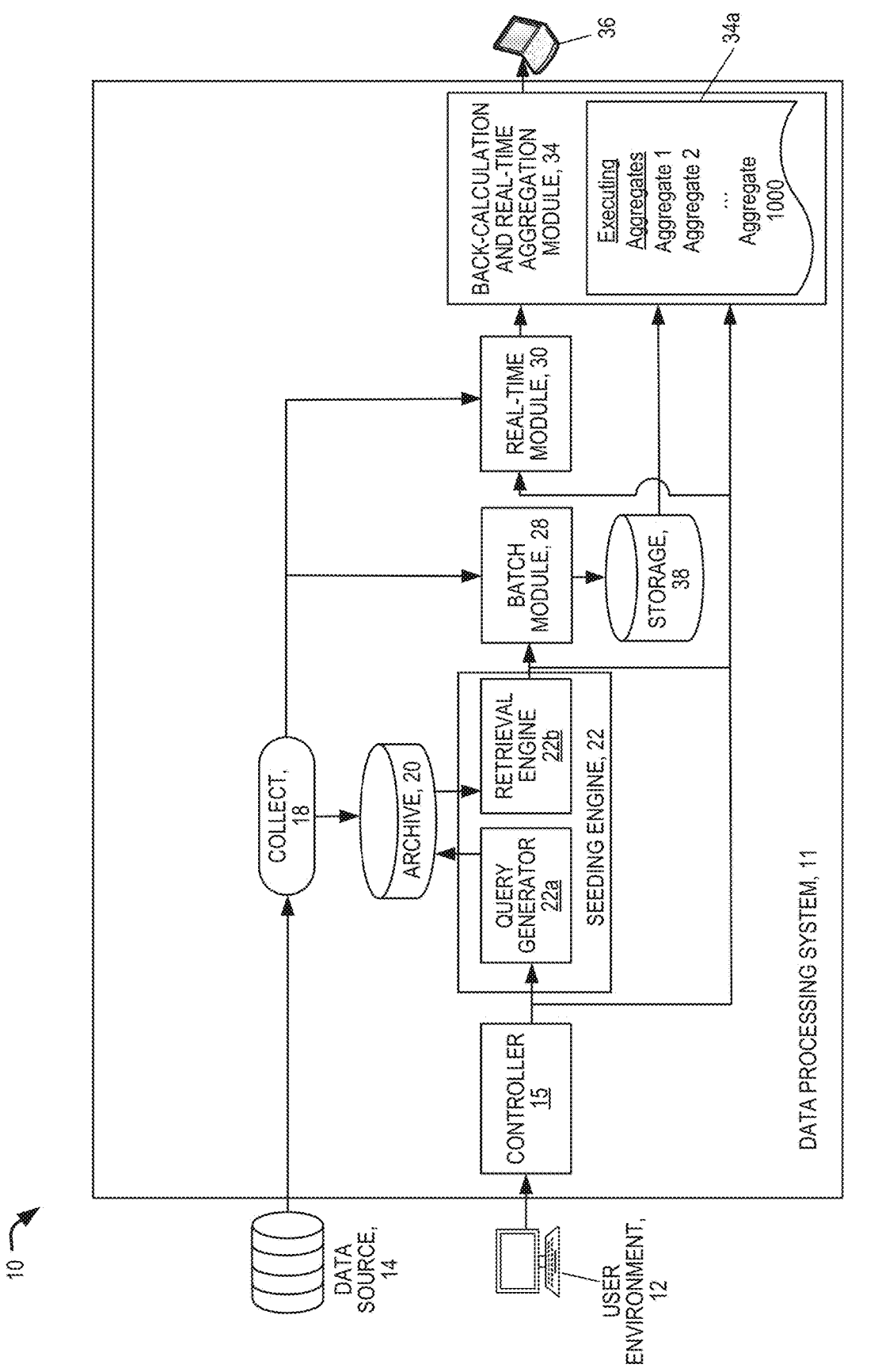
FIG. 1 is a block diagram of a system for computing aggregates, without having to wait for an aggregate amount of real data.

Referring to FIG. 1, a system 10 for producing a back aggregation includes a data processing system 11, a user environment 12, and data source 14. User environment 12 includes a back-calculation status and back-calculation user interface (see FIG. 4). The data source 14 includes germane saved historical event data, (e.g., at least 30 days-worth for a 30-day aggregate, or 7 days-worth for a 7-day aggregate, etc.). The user environment 12 has a direct input to a controller 15, whereas the data source 14 has a direct input to a collect module 18. The collect module 18 feeds an archive 20 (e.g., non-volatile memory). The archive 20 receives queries from a query generator 22a and sends query results to a retrieval engine 22b. The query generator 22a generates queries for the stored historical data, according to the type of aggregate that is selected by the user environment 12. The query generator 22a and the retrieval engine 22b are part of a seeding system 22. The collect module 18 also stores data from the data source(s) 14 and transfers data to a batch module 28 and a real-time module 30. The real-time module 30 has a direct input to a back-calculation and real-time aggregation module 34, which is executing previously running aggregates 34a (e.g., aggregates 1 . . . 1000). As described herein, these previously running aggregates will provide data from which to calculate a value of a new aggregate (for which no data has been collected or for which only a few days' worth of data has been collected). For example, if a new aggregate requires 90 days' worth of data, a typical system would require the aggregate to be running for 90 days before any value of the aggregate is produced. However, by using data that was collected for previously running aggregates, the system described herein can provide values for aggregates much more quickly, e.g., after the aggregate has been running for only 1 or 2 days. The back-calculation and real-time aggregation module 34 provides an output to a client device 36 that includes a back-calculation of real-time aggregates 34a. The back-calculation and real-time aggregation module 34 provides the real-time aggregates 34a to the client device 36.

Figure 2A:
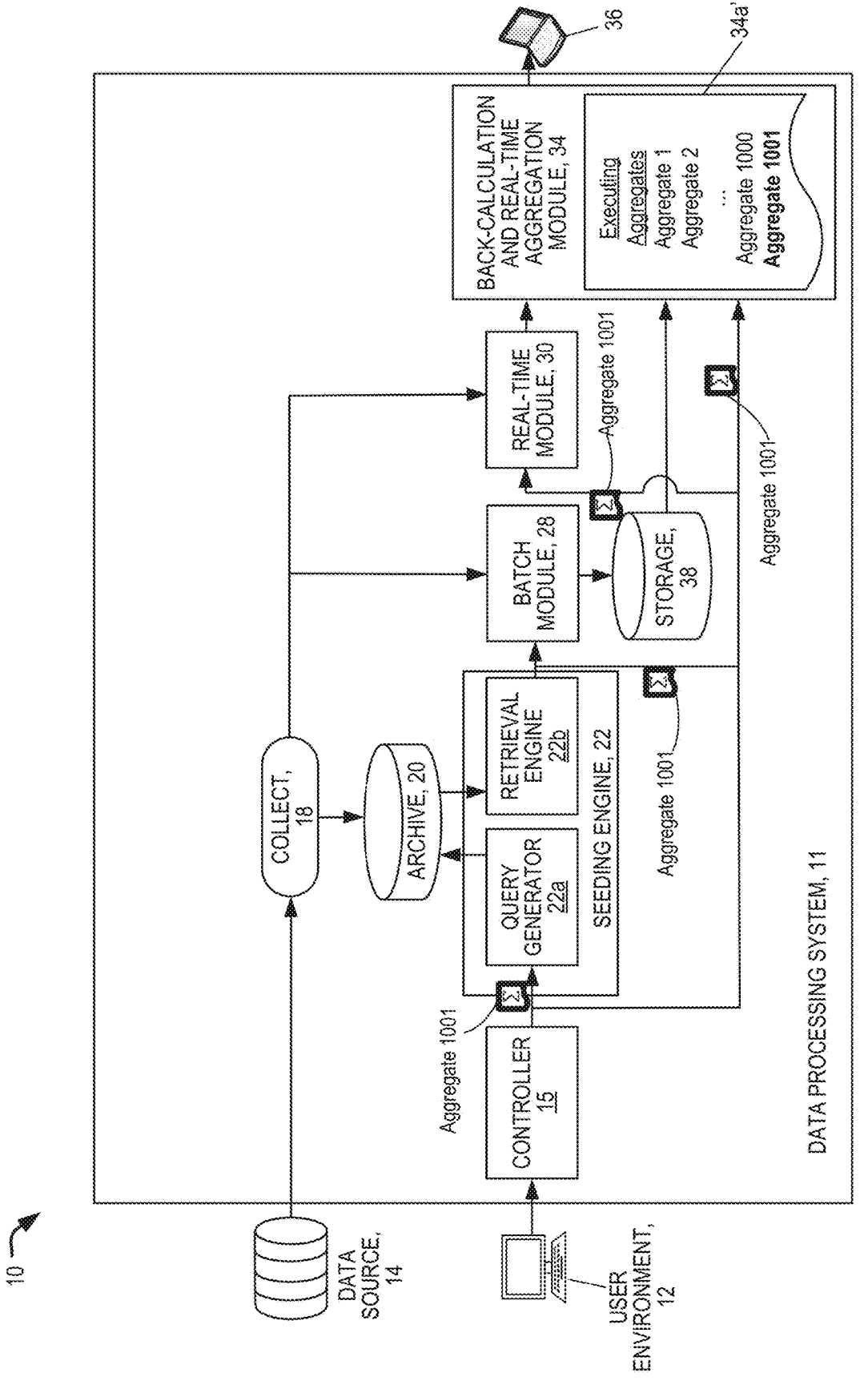
FIGS. 2A-2D are block diagrams of the system of FIG. 1 in various stages of computing an aggregate.

Referring now to FIG. 2A, the system 10 is configured for producing a back aggregation using back-calculation and real-time aggregation module 34. The user environment 12 sends to the controller 15, a definition of new aggregate, e.g., over 90 days. The controller 15 produces control signals to control operation of each of the query generator 22a, the batch module 28, the real-time module 30, and the back-calculation and real-time aggregation module 34. The back-calculation and real-time aggregation module 34 has executing aggregates 34a' including aggregate 1, aggregate 2, etc. aggregate 1000 and the new aggregate 1001.

Figure 2B:
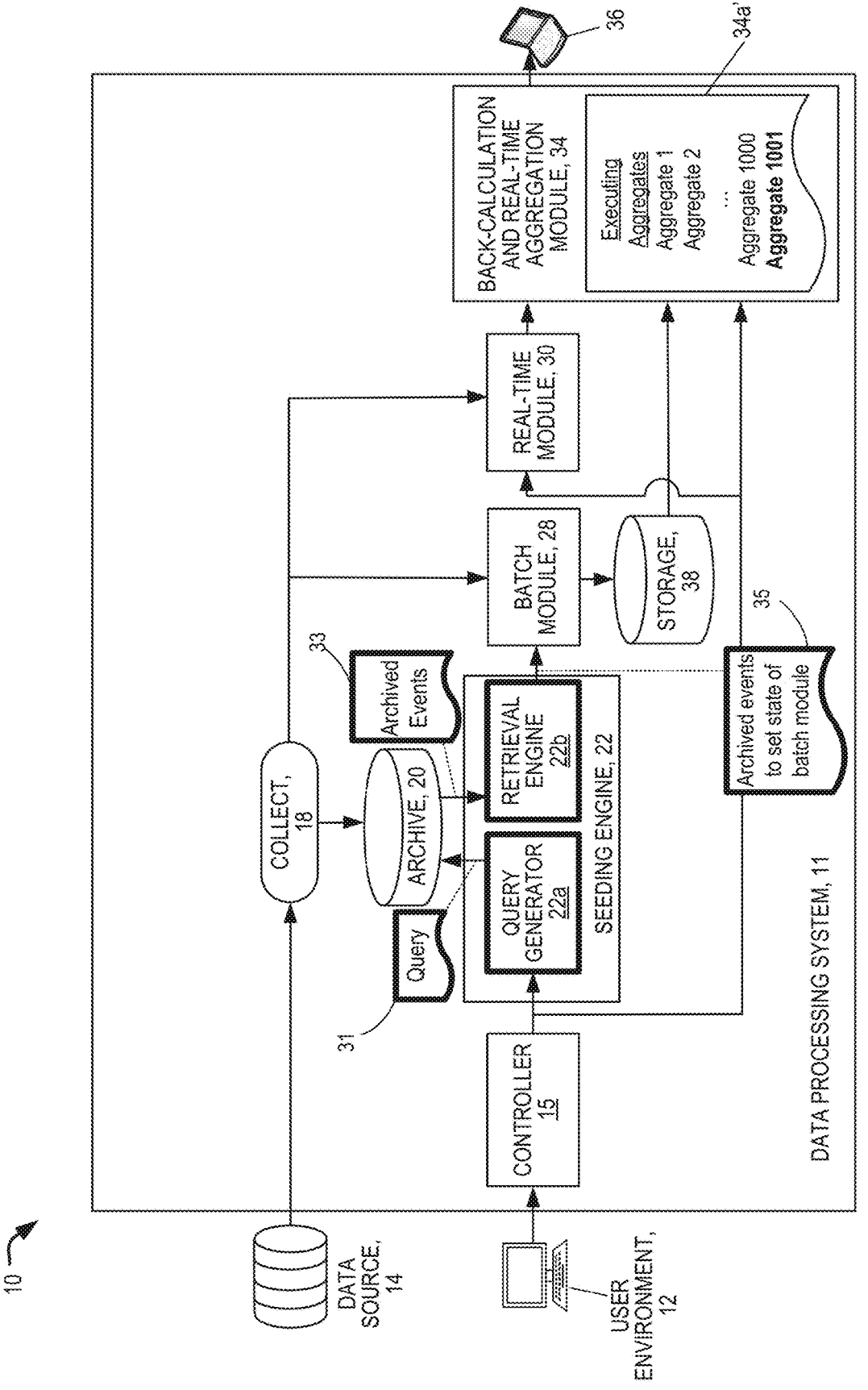

Referring to FIG. 2B, the collect module 18 receives streamed data from the data source 14. The controller 15 causes the query generator 22a to generate a query 31 (or request) that is sent to the archive 20. Based on the query, the archive sends archived events 33 to the retrieval engine 22b. The archived events include data that was collected from the previously running aggregates 34a. Retrieval engine 22b may filter archived events 33 to only include those events specified by the query 31. Retrieval engine 22b transmits archived event 35 to batch module 28. The archived events 35 set the state of the batch module 28. In some examples, archived events 35 are a filtered version of archived events 33.

Figure 2C:
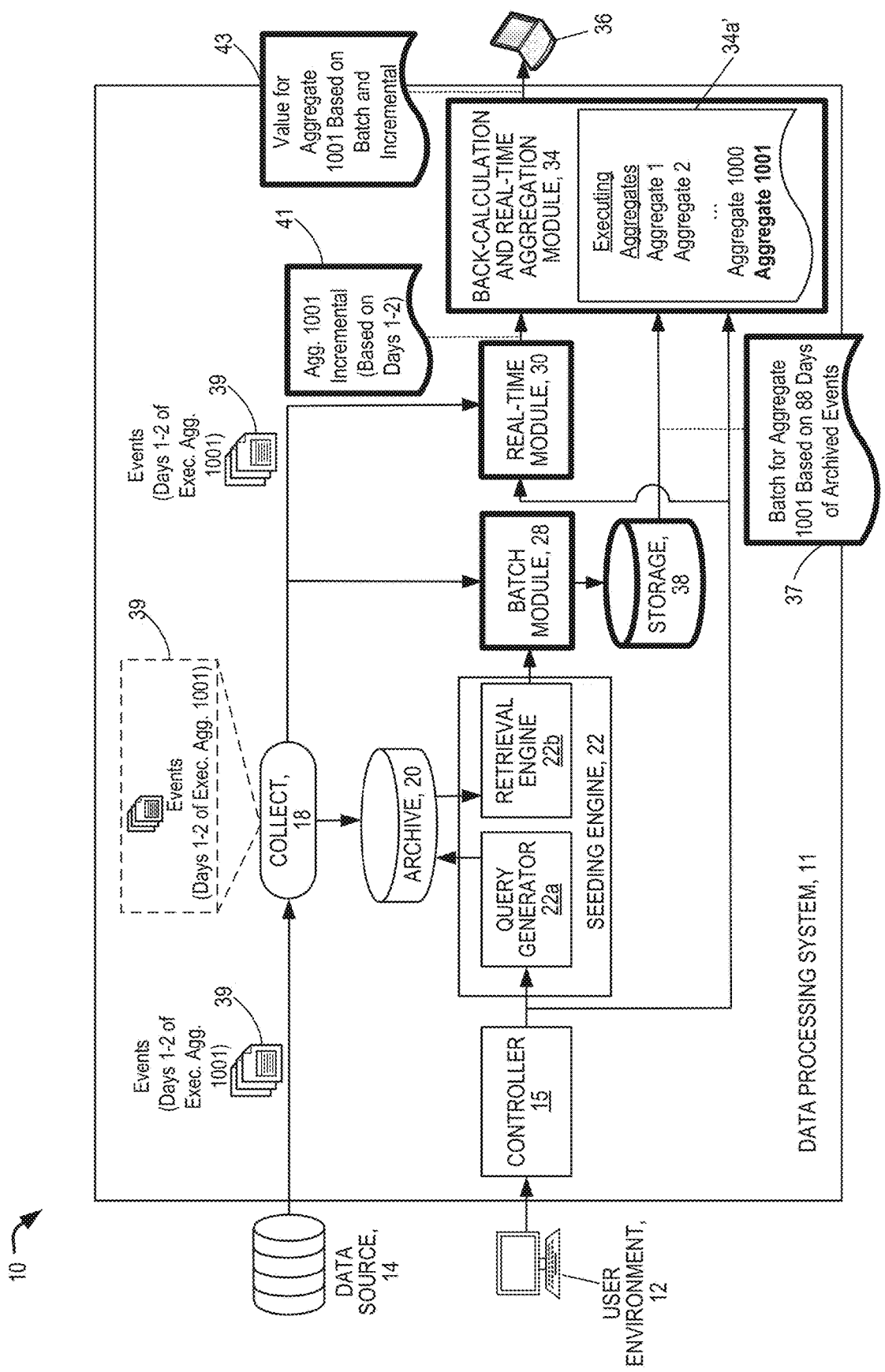

Referring to FIG. 2C, the data source 14 receives event data 39 for days 1 and 2 for execution of new aggregate 1001. The back-calculation and real-time aggregation module 34 is executing the new aggregate 1001. The batch module 28 causes the storage module 38 (e.g., volatile or non-volatile data storage) to output batch aggregate 37 based on 88 days of archived events stored in and retrieved from archive 20. By using a batch approach to retrieve (from archive 20, such as from disk) data that has already been collected from previously running aggregates, the system described herein only has to retrieve the data once, to save computing time and resources. Then, that retrieved data can be stored locally for reuse for this and subsequent processing described in the following figures. The collect module 18 sends stored events 39 from days 1 and 2 to the real-time module 30. In turn, real-time module 30 computes incremental data 41 for aggregate 1001, with incremental data 41 being based on events 39. The calculated batch aggregation 43 based on 88 days of archived events and the collected events from days 1 and 2 are sent to from the back-calculation and real-time aggregation module 34 to client device 36. Storage 38 can store a subset of the data stored in archive, which subset is retrieved by the batch retrieval. The number of times archive 20 needs to be accessed is reduced by the batch retrieval, which reduces time and resources consumed for the access to the data stored in archive 20. All historic data relevant for the aggregate is accessed once from archive 20 by the batch retrieval.

Figure 2D:
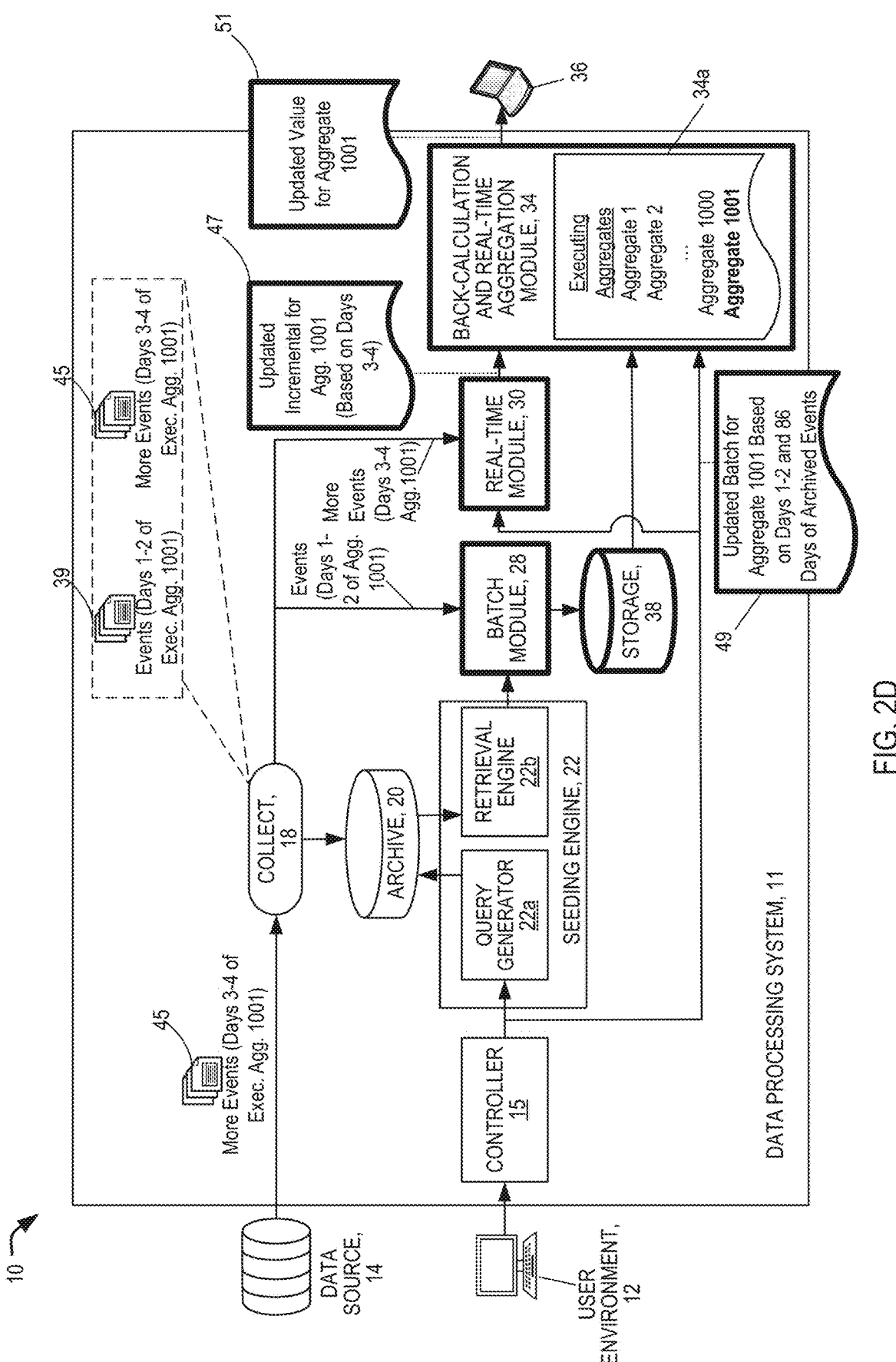

Referring to FIG. 2D, the data source 14 next receives event data 45 for days 3 and 4 for execution of new aggregate 1001. The back-calculation and real-time aggregation module 34 is executing the new aggregate 1001. The batch module 28 causes the storage module 38 to output a new batch aggregate 49 based on 86 days of archived events and events 39 for days 1 and 2. That is, the archived events are retrieved only once and sent to the batch module 28. The batch module 28 uses and re-uses those archived events in generating batch aggregates (e.g., that are only based on archived events) and batch aggregates that are partially based on the archived events and partially based on newly collected events. The collect module 18 sends stored events 39 from days 1 and 2 to the batch module 28. The collect module 18 sends stored events 45 from days 3 and 4 to the real-time module 30. In turn, real-time module 30 generates and transmits updated incremental data 47 for aggregate 1001. The calculated batch aggregation 49 based on 86 days of archived events and the stored events 39 from days 1 and 2 are sent (from storage 38, which in-turn received updated batch 49 from batch module 28) to the back-calculation and real-time aggregation module 34. The back-calculation and real-time aggregation module 34 provides as output 51 an updated value of the new aggregate 1001.

Figure 3A:
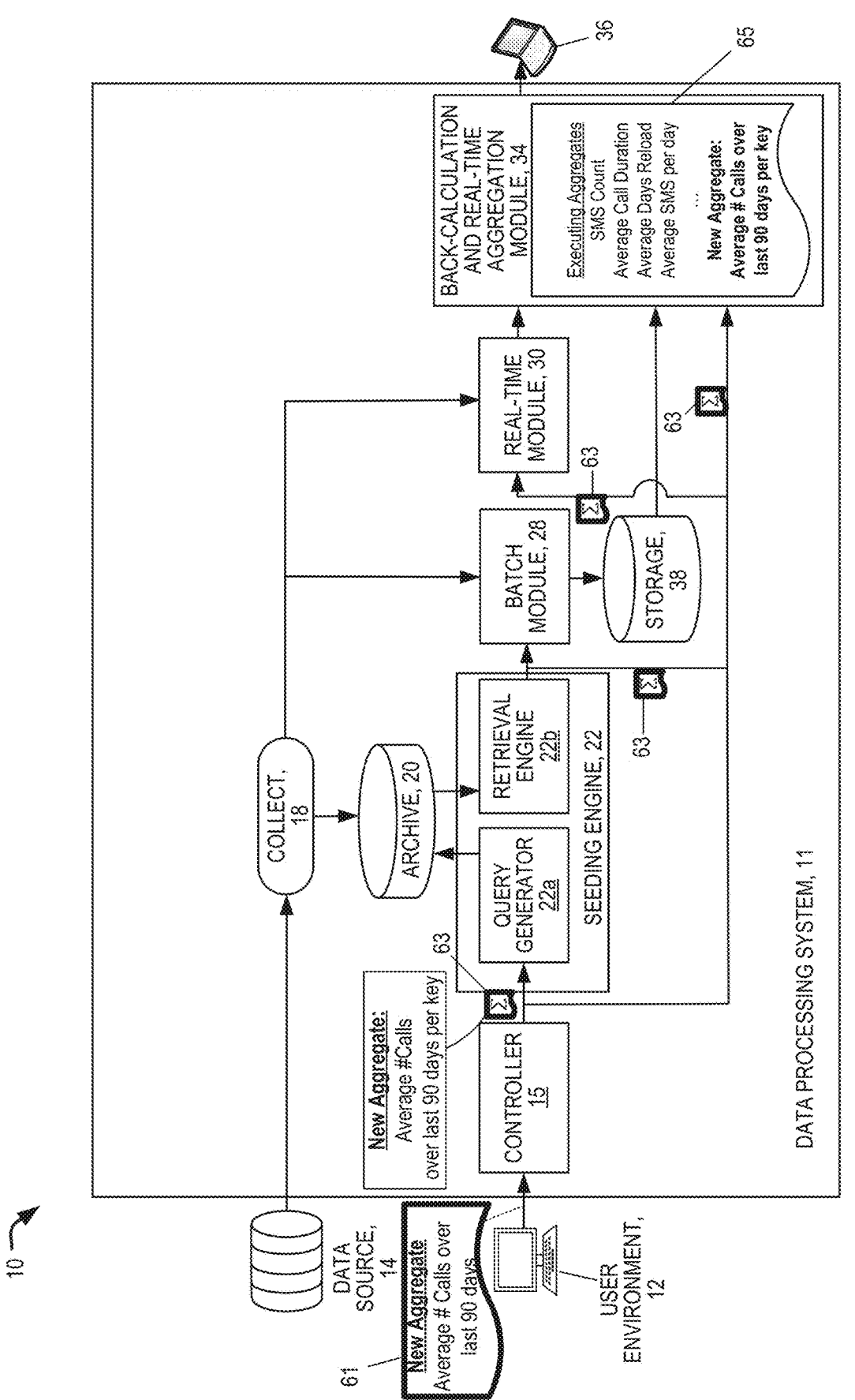

Referring to FIG. 3A, the system 10 is shown for producing a back aggregate calculation of average number of calls over the last 90 days for a new aggregate. The user environment 12 sends to the controller 15, a definition 61 of new aggregate, e.g., average number of calls over the last 90 days. The controller 15 produces control signals to control operation of each of the query generator 22a, the batch module 28, the real-time module 30, and the back-calculation and real-time aggregation module 34. The controller 15 generates new aggregate control signal 63 and transmits new aggregate control signal 63 to query generator 22a, the batch module 28, the real-time module 30, and the back-calculation and real-time aggregation module 34. Based on control signal 63, query generator 22a determines what types of data and events to query from archive 20. Based on control signal 63, each of batch module 28 and real-time module 30 determine how to generate batch and incremental data. Based on control signal 63, back-calculation and real-time aggregation module 34 executes a new aggregate in accordance with signal 63. The back-calculation and real-time aggregation module 34 has executing aggregates 65 for average call duration, average days reload, average Short Message/Messaging Service (SMS) per day and the new aggregate average number of calls over the last 90 days.

Referring to FIG. 3B, the collect module 18 receives streamed data from the data source 14. The controller 15 causes the query generator 22a to generate a query 67 (Query Events in New Agg.) that is sent to the archive 20. In this example, archive 20 stores archived events 71—including distinct event types. The archived events 71 are shown in Table 1, below, where "CustID" is a key for aggregation:

TABLE 1

| Archived events | | | | | |
|---|---|---|---|---|---|
| Date | CustID | Event Type | Value | Duration | Time |
| Mar. 4, 2022 | 6324 | Call | 1 | 1:23:05 | 17:34 |
| Mar. 4, 2022 | 4245 | SMS | 1 | n/a | |
| Mar. 4, 2022 | 4215 | Reload | 60 | n/a | 12:15 |
| | | . . . | | | |
| Aug. 25, 2022 | 6324 | Call | 1 | 0:56 | 13:54 |

Based on the query, the archive sends archive events "Archived Call Events" 69 to the retrieval engine 22*b*. Query 67 specifies the types of events that are being queried and archive 20 only returns those types of events. The archived events 69 set the state of the batch module 28.

Figure 3C:
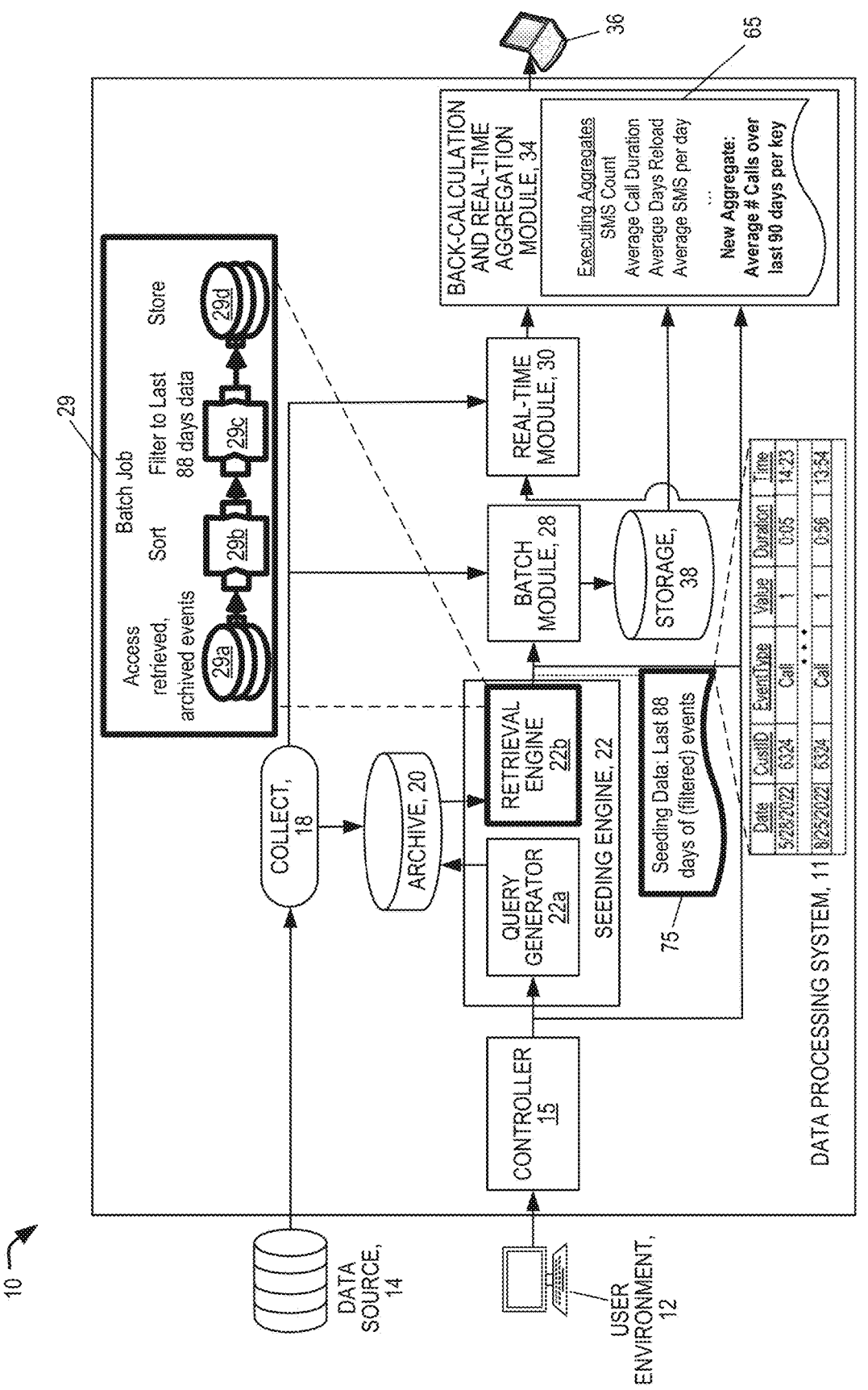

Referring to FIG. 3C, the back-calculation and real-time aggregation module 34 is executing the new aggregate. The retrieval engine 22*b* executes batch job 29 to produce batch data for batch module 28. In this example, batch job 29 filters the retrieved data to only include the last 88 days of data. This is because system 10 is configured such that a back calculation is produced after only 2 days of running a new aggregate. As such, system 10 needs 88 days of archived data (e.g., that were collected for previously running aggregates) and 2 days of data collected for the newly executed aggregates. The batch module 28 executes batch job 29 as a computation graph (or dataflow graph) that includes dataflow graph components, such as, access retrieved archived events component 29*a*, a sort component 29*b*, a filter component 29*c* to filter to last 88 days of events, and a store component 29*d* that stores the last 88 days of events. Dataflow graph components include data processing components and/or datasets such as a data sink and/or a data source. The dataflow graph can be represented by a directed graph that includes nodes or vertices, representing the dataflow graph components, connected by directed links or data flow connections, representing flows of work elements (i.e., data) between the dataflow graph components. The data processing components include code for processing data from at least one data input and providing data to at least one data output of the data processing component. The dataflow graph can thus implement a graph-based computation performed on data flowing from one or more input data sets through the graph components to one or more output data sets.

Based on execution of batch job 29 against archived call events 69, retrieval engine 22*b* generates seeding data 75 that includes the last 88 days of events and transmits seeding data 75 to batch module 28 to set the state of batch module 28.

Table 2 below also shows the seeding data 75 after execution of the computation graph 29 (also referred to as the batch job 29).

TABLE 2

| Batch - Filtered to call events | | | | | |
|---|---|---|---|---|---|
| Date | CustID | Event Type | Value | Duration | Time |
| May 28, 2022 | 6324 | Call | 1 | 0:05 | 14:23 |
| | | . . . | | | |
| Aug. 25, 2022 | 6324 | Call | 1 | 0:56 | 13:54 |

The collect module 18 sends stored events from days 1 and 2 to the batch module 28. The calculated batch aggregation based on 88 days of archived events and the stored events from days 1 and 2 are sent to the back-calculation and real-time aggregation module 34.

Figure 3D:
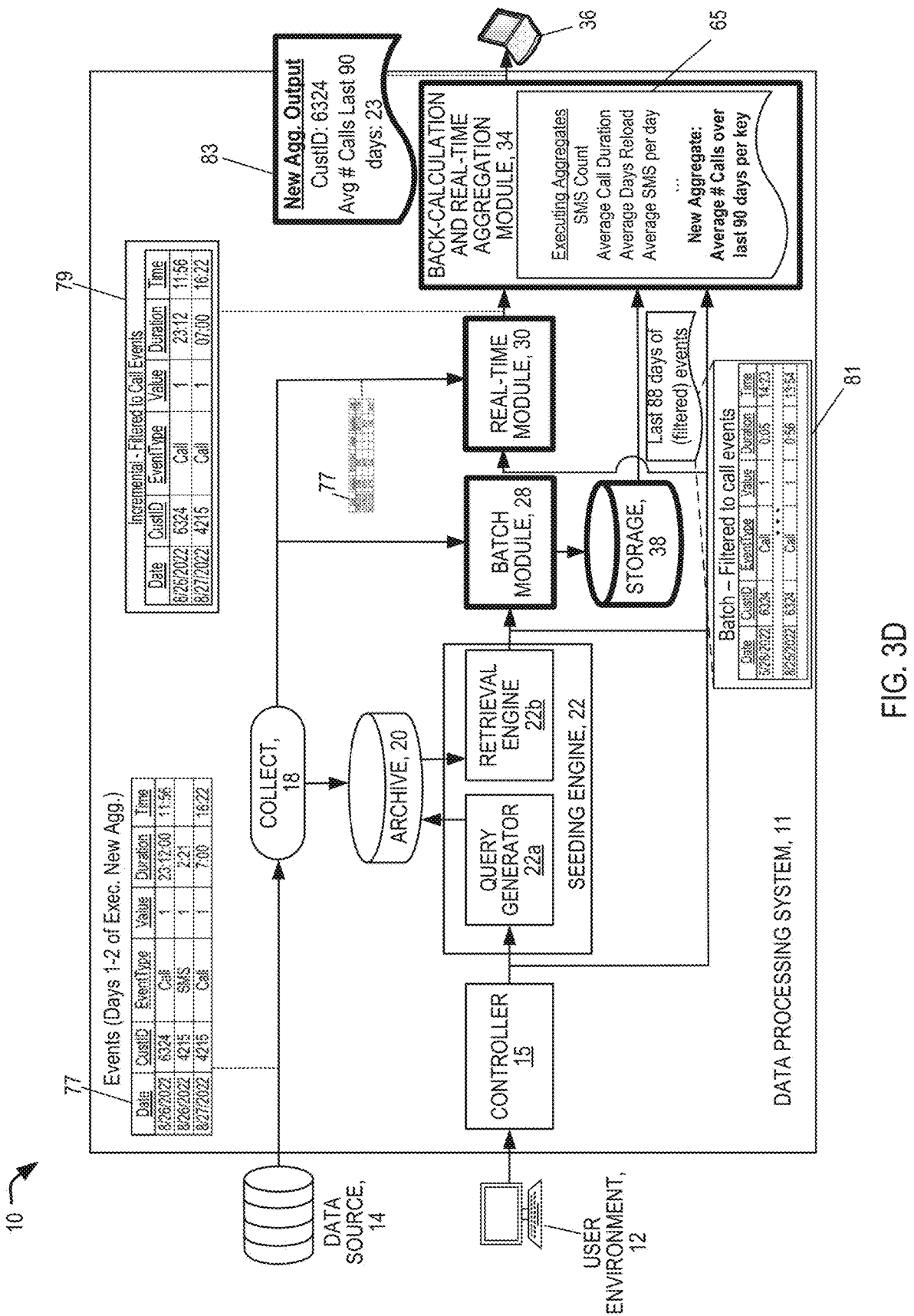

Referring to FIG. 3D, the data source 14 next receives event data 77 for days 1 and 2 for execution of aggregate of average number of calls over last 90 days per key, as shown below in Table 3.

TABLE 3

| Date | CustID | Event Type | Value | Duration | Time |
|---|---|---|---|---|---|
| Aug. 26, 2022 | 6324 | Call | 1 | 23:12 | 11:56 |
| Aug. 26, 2022 | 4215 | SMS | 1 | 2:21 | |
| Aug. 27, 2022 | 4215 | Call | 1 | 07:00 | 16:22 |

The batch module 28 seeded with 88 days of events stores the 88 days of events in storage module 38 to output batch aggregate 81 based on 88 days of archived events, as in Table 4.

TABLE 4

| Batch - Filtered to call events | | | | | |
|---|---|---|---|---|---|
| Date | CustID | Event Type | Value | Duration | Time |
| May 28, 2022 | 6324 | Call | 1 | 0:05 | 14:23 |
| | | . . . | | | |
| Aug. 25, 2022 | 6324 | Call | 1 | 0:56 | 13:54 |

The collect module 18 sends stored events 77 from days 1 and 2 to the batch module 28 (e.g., for storage and inclusion as batch in the next iteration). The collect module 18 sends events 77 to real-time module 30. Using events 77, real-time module 30 generates incremental data 79, which is a filtered version of events 77. Real-time module 30 transmits incremental data 79 to the back-calculation and real-time aggregation module 34, as in Table 5.

TABLE 5

| Incremental - Filtered to Call Events | | | | | |
|---|---|---|---|---|---|
| Date | CustID | Event Type | Value | Duration | Time |
| Aug. 26, 2022 | 6324 | Call | 1 | 23:12 | 11:56 |
| Aug. 27, 2022 | 4215 | Call | 1 | 07:00 | 16:22 |

The calculated batch aggregation based on 88 days of archived events and the stored events from days 1 and 2 are generated by the back-calculation and real-time aggregation module 34. The back-calculation and real-time aggregation module 34 provides as output 83 an updated value of the aggregate of average number of calls over last 90 days per key. That is, module 34 computes a value 83 for new aggregate 63 based on batch data 81 (collected for previously running aggregates) and incremental data 79 collected for new aggregate 63.

Figure 3E:
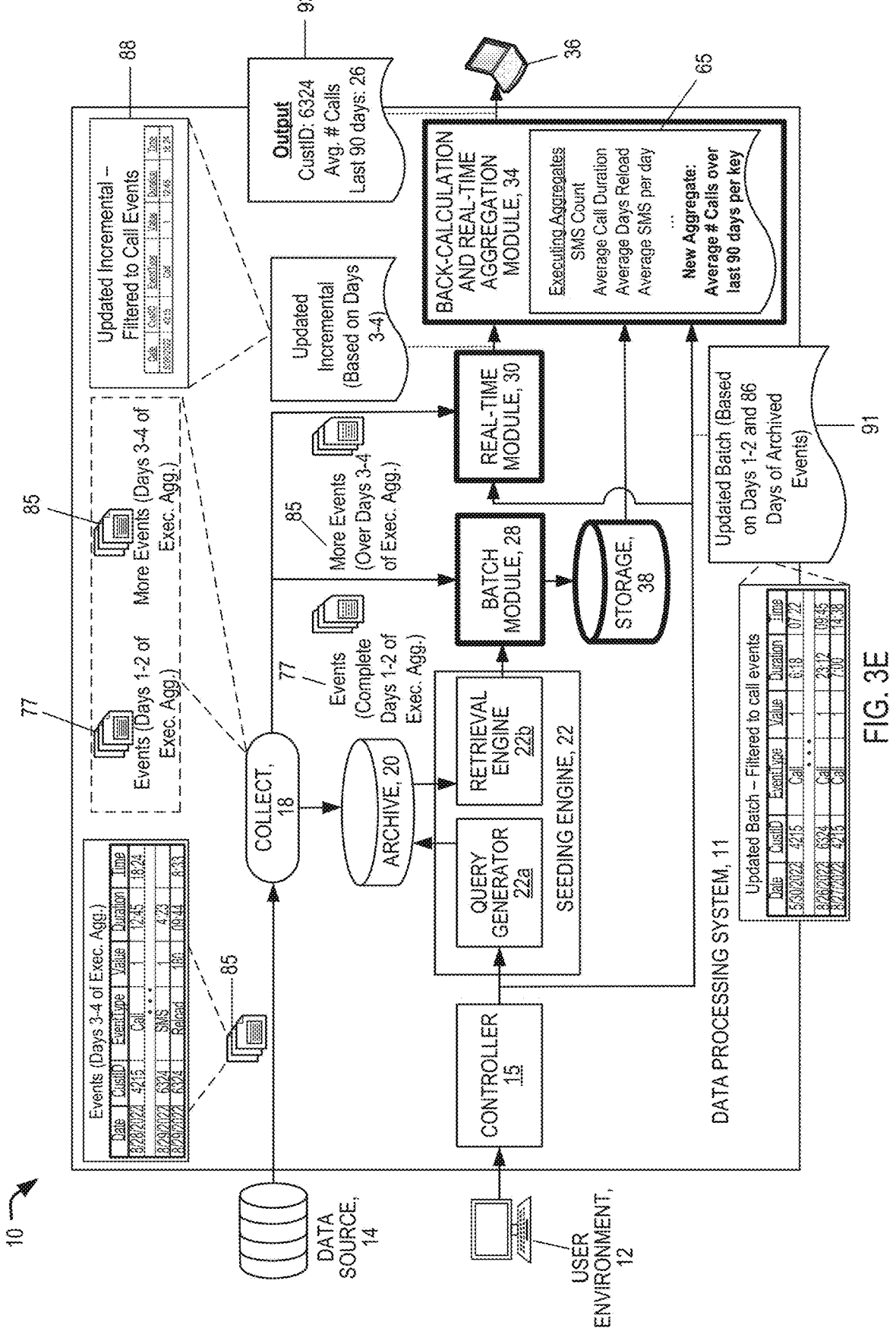

Referring to FIG. 3E, the data source 14 next receives event data 85 for days 3 and 4 for execution of the aggregate of average number of calls over last 90 days per key. These events are shown in Table 6. The collect module 18 sends stored events 77 from days 1 and 2 to the batch module 28.

TABLE 6

| Date | CustID | Event Type | Value | Duration | Time |
|------|--------|-----------|-------|----------|------|
| Aug. 28, 2022 | 4215 | Call | 1 | 12:45:00 | 18:24 |
| . . . | | | | | |
| Aug. 29, 2022 | 6324 | SMS | 1 | 4:23:00 | |
| Aug. 29, 2022 | 6324 | Reload | 180 | 09:44 | 8:33 |

The batch module 28 seeded with 86 days of events and days 1 and 2 of events, stores the 86 days of events and days 1 and 2 of events in storage module 38, and outputs updated batch 91 based on 86 days of archived events on days 1 and 2, as in Table 7.

TABLE 7

Updated Batch - Filtered to call events

| Date | CustID | Event Type | Value | Duration | Time |
|------|--------|-----------|-------|----------|------|
| May 30, 2022 | 4215 | Call | 1 | 6:18 | 07:22 |
| . . . | | | | | |
| Aug. 26, 2022 | 6324 | Call | 1 | 23:12 | 09:45 |
| Aug. 27, 2022 | 4215 | Call | 1 | 7:00 | 14:38 |

The collect module 18 sends stored events 85 from days 3 and 4 to the real-time module 30. The real-time module 30 sends stored events filtered to call events 88 (e.g., updated incremental events 88) from days 3 and 4 to the back-calculation and real-time aggregation module 34, as in Table 8.

TABLE 8

Incremental - Filtered to Call Events

| Date | CustID | Event Type | Value | Duration | Time |
|------|--------|-----------|-------|----------|------|
| Aug. 28, 2022 | 4215 | Call | 1 | 12:45:00 | 18:24 |

The calculated batch aggregation 93 based on 86 days of archived events and days 1 and 2 of events and the events filtered to call events from days 3 and 4 are computed by the back-calculation and real-time aggregation module 34. The back-calculation and real-time aggregation module 34 provides as output 93 an updated value of the aggregate of average number of calls over last 90 days per key. In the example of FIGS. 3A-3E that output is "Output CustID: 6324 Avg. # Calls Last 90 days: 26." In this example, incremental data 88 is an updated version of incremental data 79. Batch data 91 is an updated version of batch data 81. This process (of updating incremental data with new data collected for aggregate 63 and updating the batch data with previously collected data for aggregate 63) continues until system 11 has collected enough data (e.g., 90 days' worth) for new aggregate 63 to no longer need to use the archived data that was collected for previously running aggregates.

Figure 4:
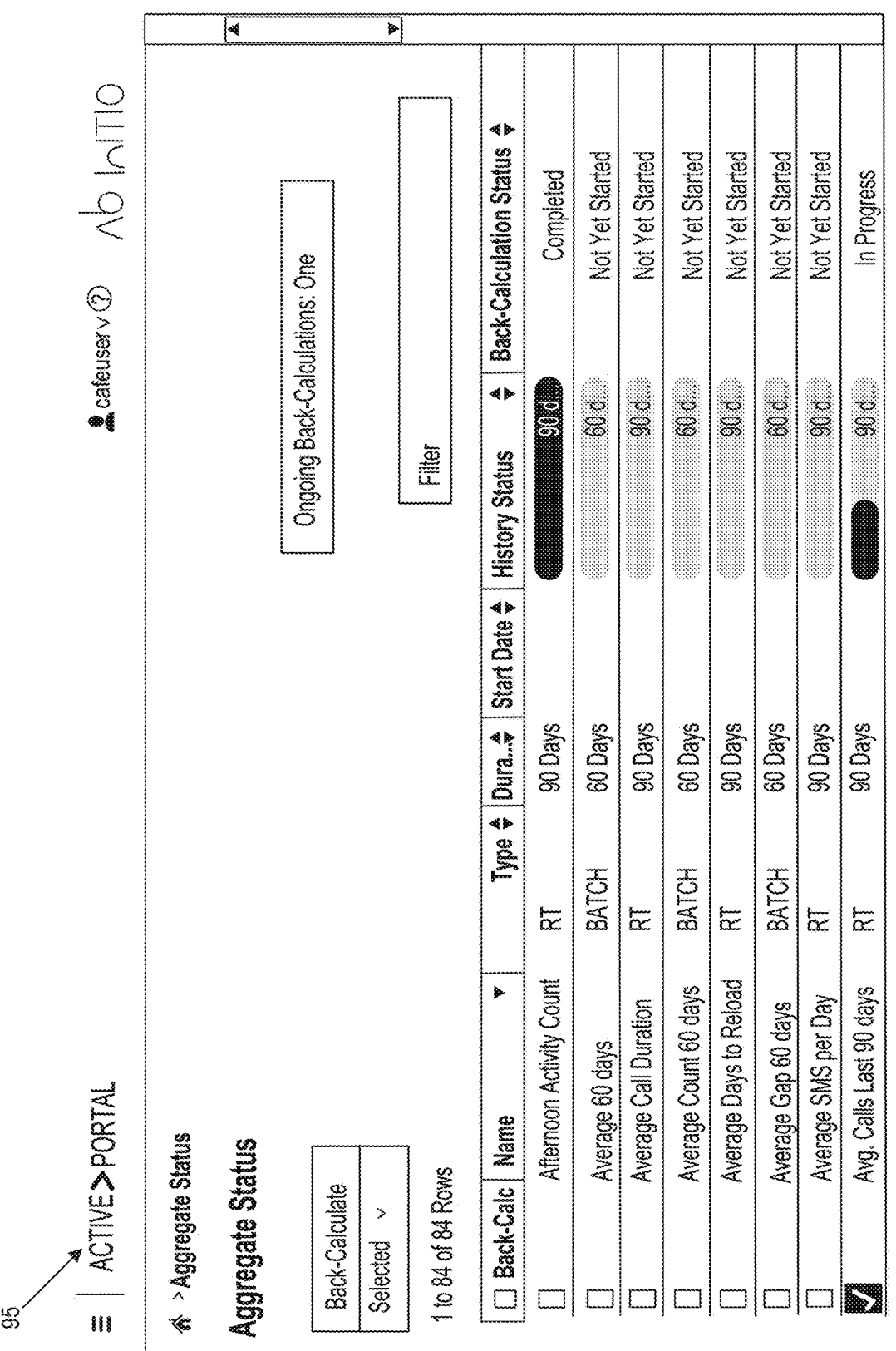
FIG. 4 is a diagram of a graphical user interface for computing an aggregate.

FIG. 4 shows graphical use interface 95 with examples of other numerous types of different aggregates that can be computed. The examples include "Afternoon Activity Count," "Average 60 days," "Average Call Duration," "Average Count 60 days," "Average Days to Reload," "Average Gap 60 days," and "Average SMS per day," in addition to the "Ave. Calls Last 90 days," as explained in the example above. Many other examples are available with the system 10.

Referring now to FIG. 5, a technique 80 executed by a data processing system for determining a value of a near real-time aggregate over a period of time when the data processing system has not aggregated data for the aggregate over the period of time is described. Generally, near real-time refers to current or up-to-date. The technique 80 includes executing 82, by the data processing system, an expression specifying a near real-time aggregate over a period of time, with the near real-time aggregate being based on one or more occurrences of one or more events, with near real-time being with regard to when an event occurs. The real-time aggregate is determined by executing the expression against one or more inputs (to the expression). The technique 80 also includes that when the data processing system has not collected data for the near real-time aggregate over the period of time, the data processing system retrieves 84 from a data storage system historical data and identifies 86 in the historical data, one or more occurrences of the one or more events over the period of time. The techniques also include identifying, in the historical data, one or more items of the historical data representing one or more historical occurrences of the one or more events, with the one or more historical occurrences occurring over a historical period of time, with an amount of time (e.g., a number of minutes, a number of days, and so forth) specified by the historical period of time corresponding to an amount of time specified by the period of time. These items of historical data are then used as a proxy for near real-time data in determining a value of the near real-time aggregate.

The technique 80 also includes determining 88 a value of the near real-time aggregate over the period of time based on the identified one or more occurrences of the one or more events and storing 90 the value of the near real-time aggregate, in memory of the data processing system. The technique 80 also includes detecting 92, in data items received by the data processing system, one or more data items specifying one or more occurrences of the one or events as the expression executes, and based on the one or more detected data items, updating 94 the value of the near real-time aggregate stored in memory.

Figure 6A:
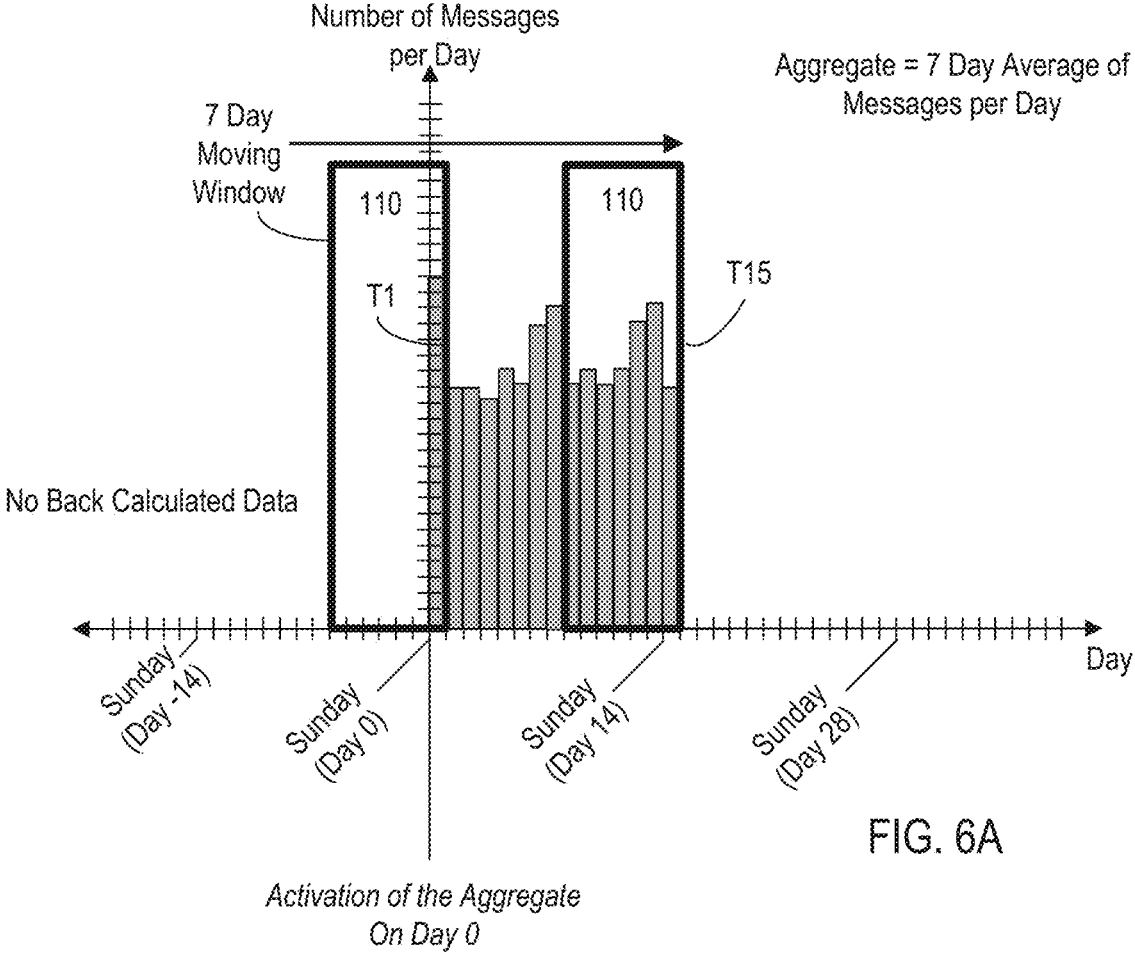
FIGS. 6A-6B are diagrams that depict a computation of an aggregate, without back calculation of data.
Figure 6B:
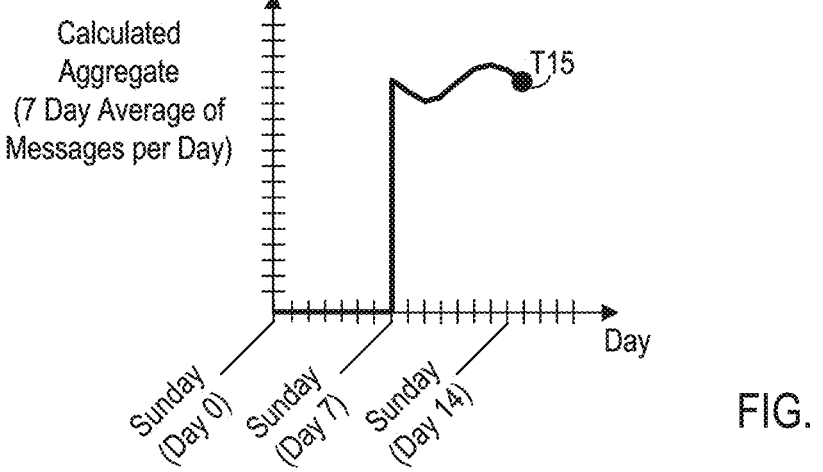

Referring now to FIG. 6A, an example without any back-calculated data is shown. Activation of the aggregate occurs on day 0. A seven (7) day moving average window T1 and a second seven (7) day moving average window T15 are shown across the data. FIG. 6B shows results of applying the seven (7) day moving average window 110 across the data, with no data presented from Sunday 0 to the day prior to Sunday day 7, i.e., Saturday day 6, and thereafter data from Sunday day 7 to Sunday day 14, etc.

Figure 7A:
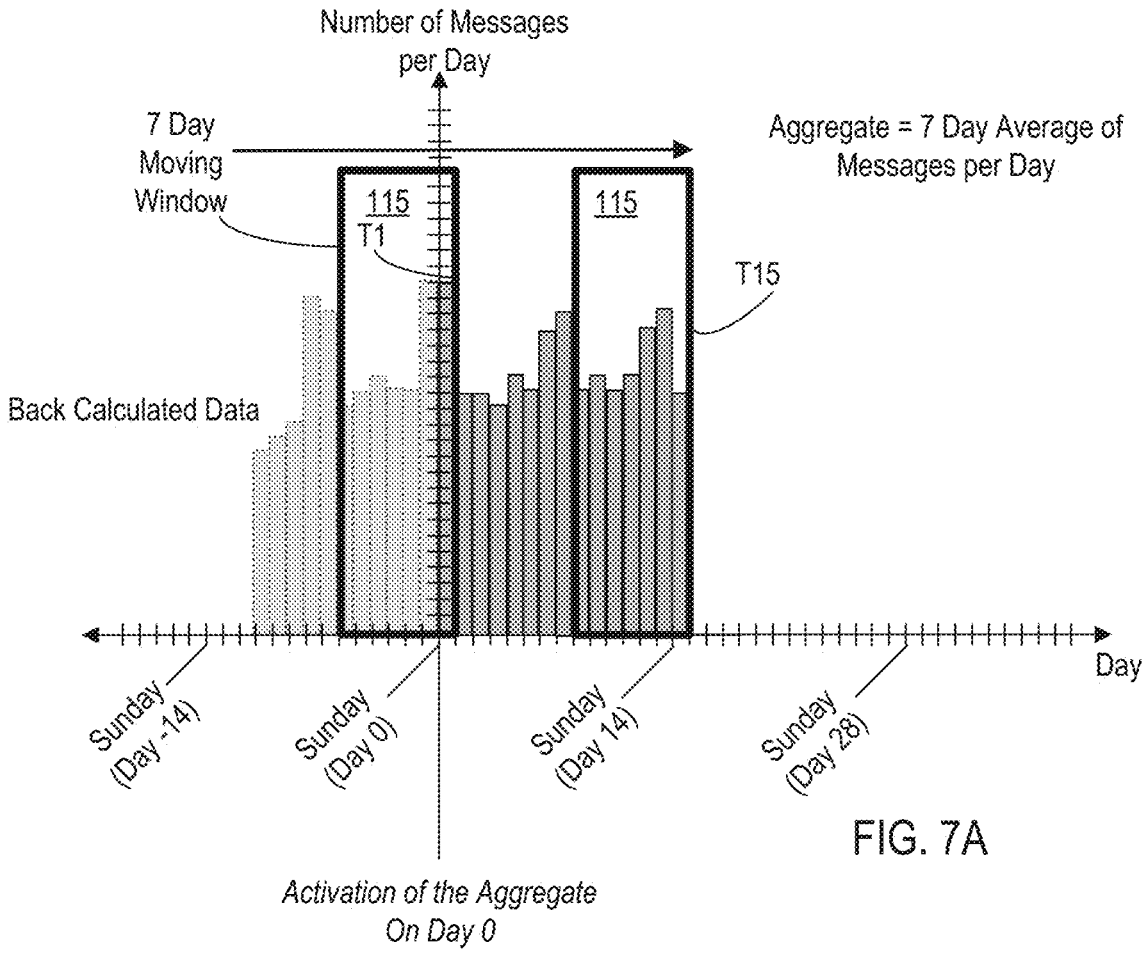
FIGS. 7A-7B are diagrams that depict a computation of an aggregate, with back calculation of data.
Figure 7B:
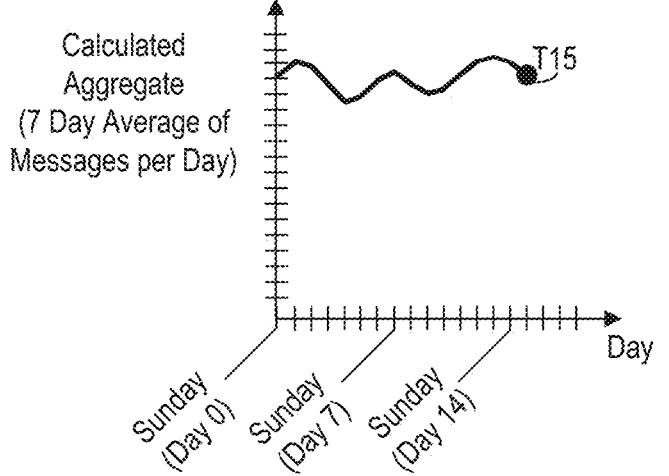

Referring now to FIG. 7A, an example with back-calculated data is shown. Activation of the aggregate occurs on day 0. A seven (7) day moving average window T1 is applied to the data. Initially, the seven (7) day moving average window 115 is applied to 6 days of back-calculated data and one day T1 of real data. Thereafter, the seven (7) day moving average window 115 is applied to 7 days of real data, ending at day T15. FIG. 7B shows results of applying the seven (7) day moving average window 115 across the data, having no data presented from Sunday 0 to the day prior to Sunday day 7, i.e., Saturday day 6 (not shown), and thereafter data from Sunday day 7 to Sunday day 14, etc.

Figure 8A:
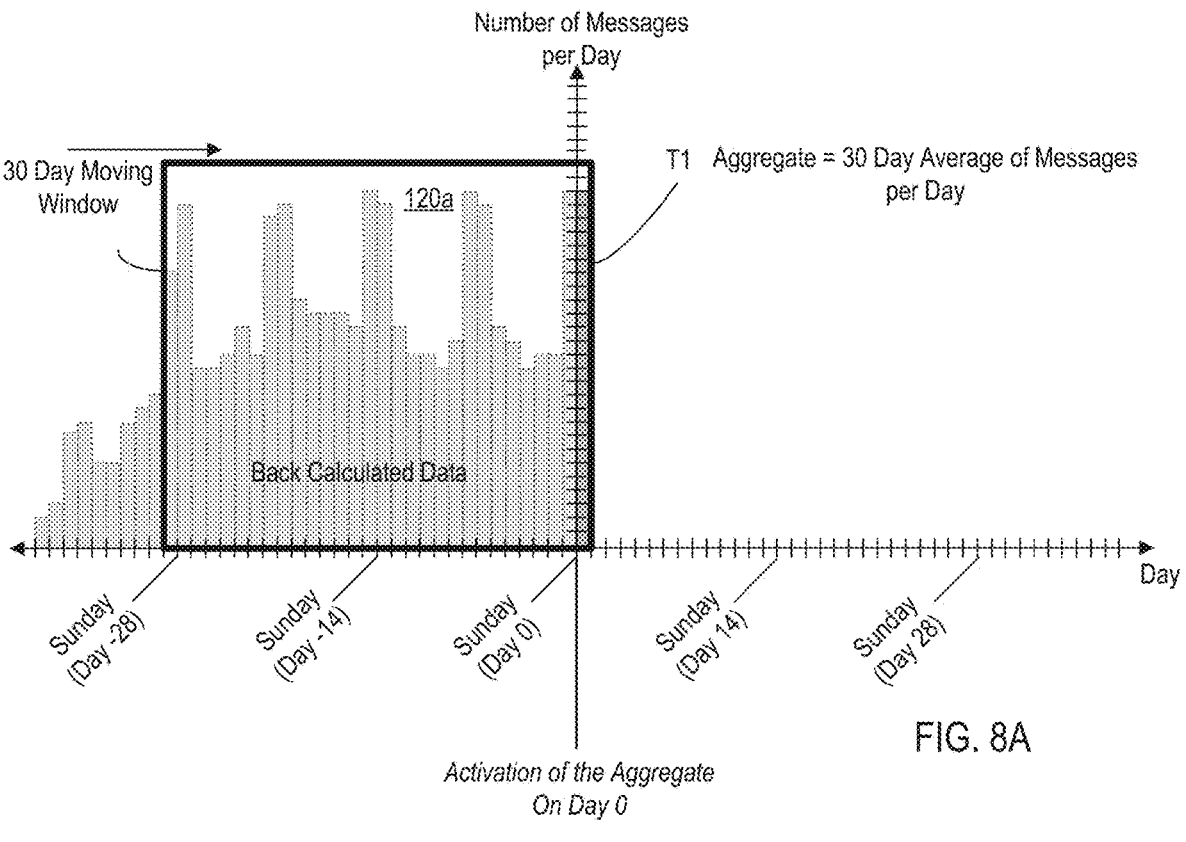
FIGS. 8A-8B are diagrams that depict another computation of an aggregate, with twenty-nine days of back-calculated data and one day of real data.
Figure 8B:
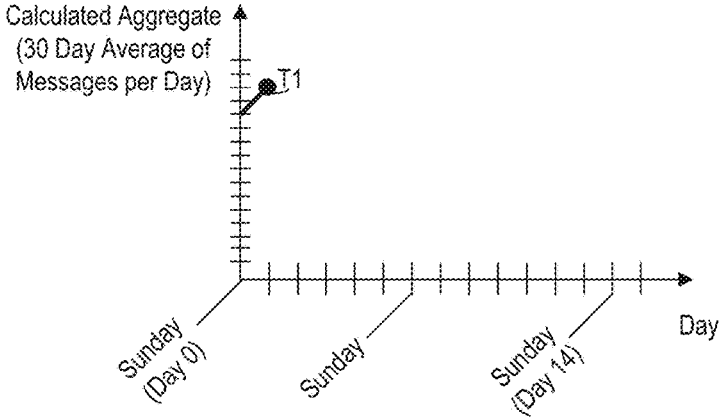

Referring now to FIG. 8A, an example of a calculated aggregate for a 30-day average of messages per day with back-calculated data is shown. Activation of the aggregate occurs on day 0. A thirty (30) day moving average window 120a is shown across 29 days of the back-calculated data and 1 day of real data. FIG. 8B shows results of applying the thirty (30) day moving average window 120a across the 29 days of the back-calculated data and 1 day of real data, with data presented from Sunday 0 to the day after Sunday day 0, labeled as T1.

Figures 8C, 8D:
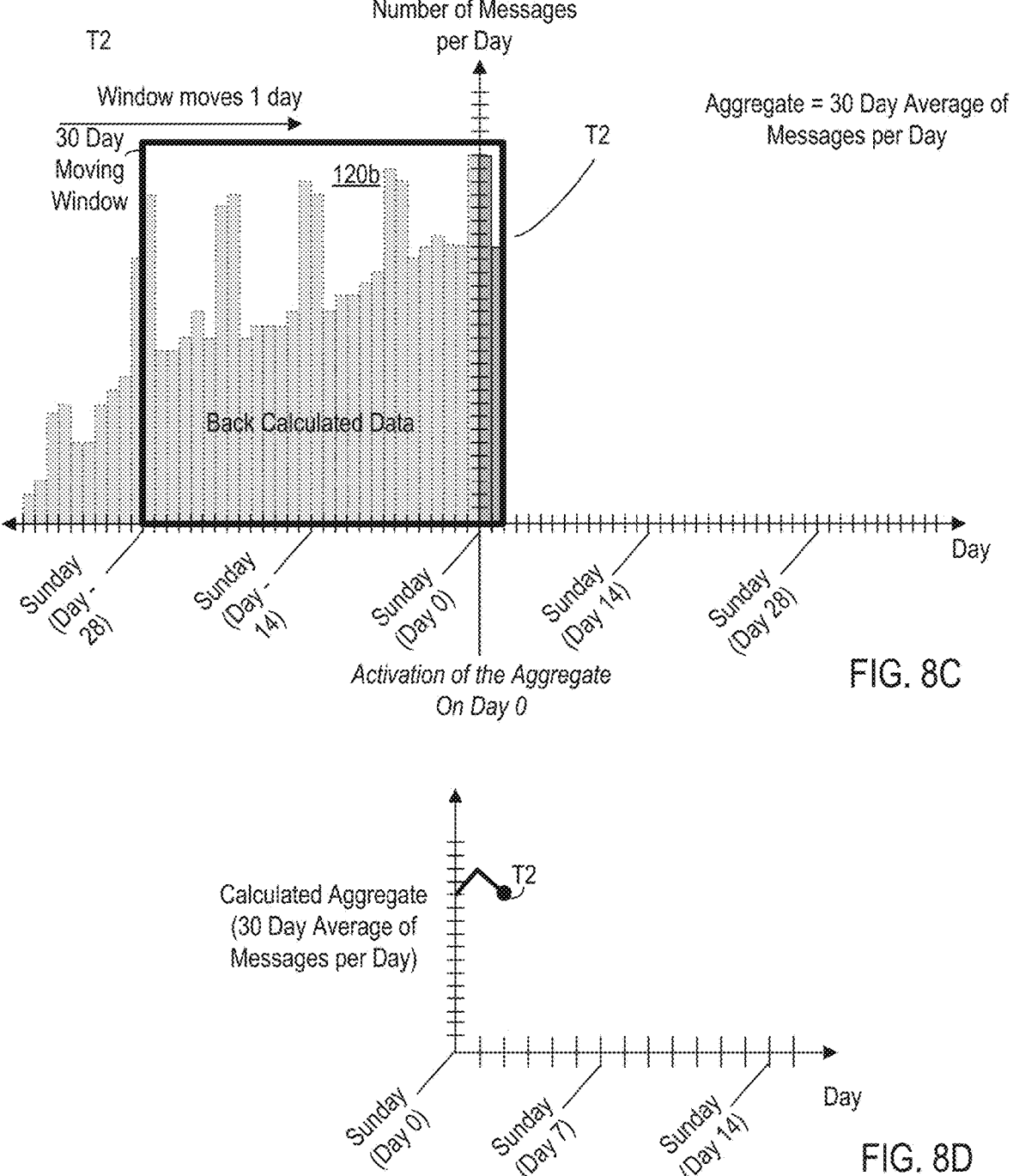
FIGS. 8C-8D are diagrams that depict another computation of an aggregate, with twenty-eight days of back-calculated data and two days of real data.

Referring now to FIG. 8C, an example of a calculated aggregate for a subsequent 30-day average of messages per day with back-calculated data is shown. Activation of the aggregate occurs on day 0. A thirty (30) day moving average window 120*b* is shown across the back-calculated data of 28 days with two days of real data (window T2 moved 1 day, relative to window 120*a* FIG. 8A). FIG. 8D shows results of applying the thirty (30) day moving average window 120*b* across the back-calculated data of 28 days with two days of real data, with data presented from Sunday 0 to two days after Sunday day 0, labeled as T2.

Figure 8E:
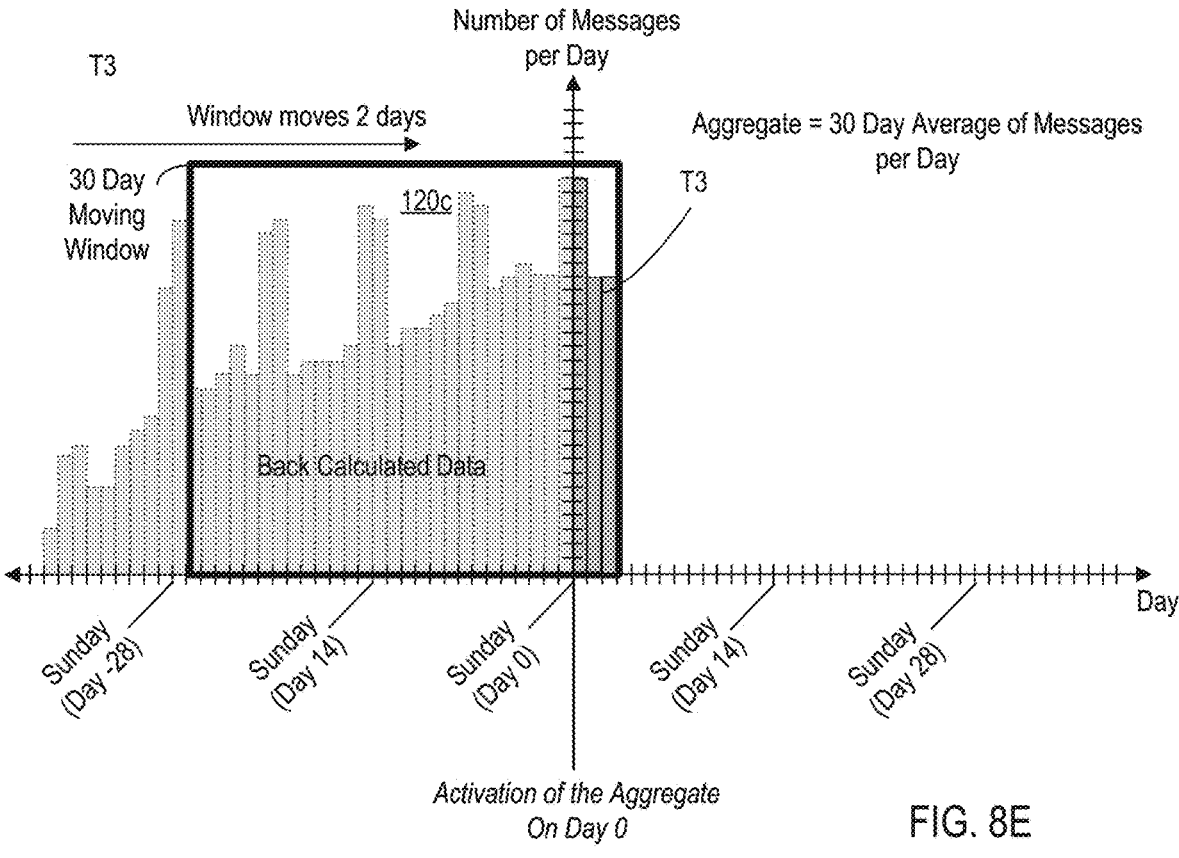
FIGS. 8E-8F are diagrams that depict another computation of an aggregate, with twenty-seven days of back-calculated data and three days of real data.
Figure 8F:
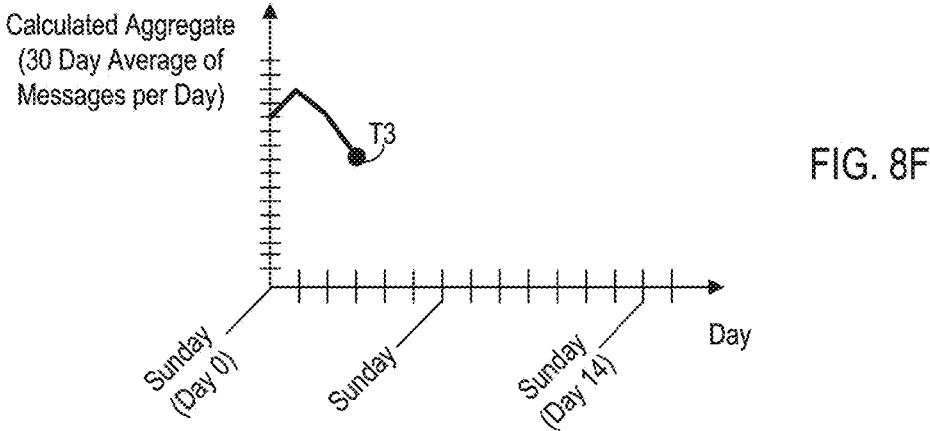

Referring now to FIG. 8E, an example of a calculated aggregate for a subsequent 30-day average of messages per day with back-calculated data is shown. Activation of the aggregate occurs on day 0. A thirty (30) day moving average window 120*c* is shown across the back-calculated data of 27 days with three days of real data (window 120*c* moved 2 days, relative to window 120*a* FIG. 8A). FIG. 8F shows results of applying the thirty (30) day moving average window 120*c* across the back-calculated data of 27 days with three days of real data, with data presented from Sunday 0 to three days after Sunday day 0, labeled as T3.

Figure 8G:
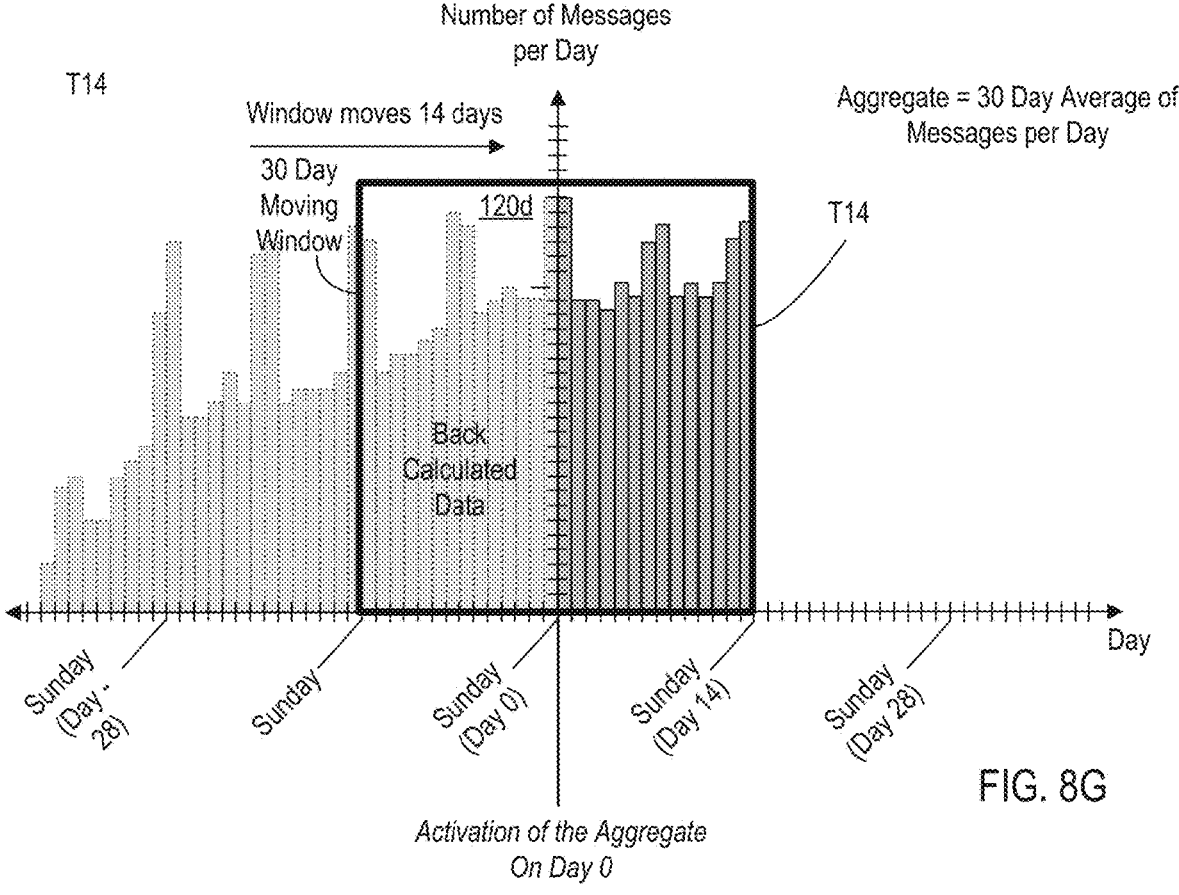
FIGS. 8G-8H are diagrams that depict another computation of an aggregate, with fourteen days of back-calculated data and fourteen days of real data.
Figure 8H:
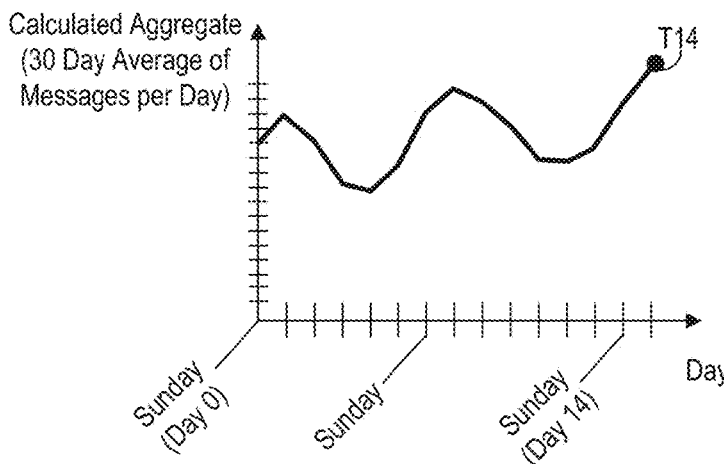

Referring now to FIG. 8G, an example of a calculated aggregate for a subsequent 30-day average of messages per day with back-calculated data is shown. Activation of the aggregate occurs on day 0. A thirty (30) day moving average window 120*d* is shown across the back-calculated data of 14 days with fourteen days of real data (window 120*d* moved 14 days, relative to window 120*a* FIG. 8A). FIG. 8H shows results of applying the thirty (30) day moving average window 120*d* across the back-calculated data of 14 days with fourteen days of real data, with data presented from Sunday 0 to fourteen days after Sunday day 0, labeled as T14.

The graph and entity configuration approach described above can be implemented using software for execution on a computer. For instance, the software forms procedures in one or more computer programs that execute on one or more computers programmed or computer programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger computer program, for example, that provides other services related to the design and configuration of dataflow graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer or delivered (encoded in a propagated signal) over a communication medium of a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

Back-Calculating Windowed Aggregates

When data is available for a windowed aggregate from a time period starting before the aggregate was deployed, the system back-calculates the aggregate, effectively moving the tracking date for the aggregate beginning at the earliest date for which there are data on disk and apply that data to the existing aggregate.

Back-calculating of a windowed aggregate, the computation uses all available data that is stored on disk. For a real-time aggregate, this means that a back-calculated aggregate value does not include the data from the most recent 48 hours, because that data is stored in memory. For example, if you have a real-time aggregate that averages an account holder's savings account balance over a 30-day period and if 10 days have elapsed so far, back-calculation generates an average account balance for the 8-day period for which you have data on disk. In contrast, for a batch aggregate, a back-calculation includes any data that was not available when the most recent nightly batch job ran.

Calculation Example

Calculation of a windowed aggregate, e.g., a 30-day average, that averages a user's credit card balance over a 30-day period and does not allow partial values is the example. The aggregate was deployed on June 1, and today is June 17, so there are 17 days' worth of data available and 13 days remaining until there is a full 30 days' worth of data that can be used to calculate an aggregate value.

However, data is available for the period from May 25 through May 31. By back-calculating the 30-day average aggregate, it moves the aggregate's start date from June 1 (the deployment date) to May 25 (the earliest date for which there is available data). Now that the aggregate's start date is May 25, and there are only 7 days remaining until there are 30 days' worth of data for the system to compute an aggregate value.

If the 30-day average aggregate allows partial values, in this case, the back calculation computes an aggregate value each night, using whatever data was available on disk. However, this nightly value will not be a true 30-day average of the account balance until at least 30 days have elapsed. This means that, on June 17, the aggregate's value will be the average account balance from June 1 through June 17, and there will be 13 days remaining until the system has a full 30 days' worth of data available to compute a complete aggregate value. However, if you back-calculate to incorporate data from May 25 through May 31, the start of data tracking moves from June 1 to May 25, and the partial aggregate value for June 17 becomes the average account balance from May 25 through June 17, leaving only 7 days remaining until the system has a full 30 days' worth of data and can the calculate a complete aggregate value.

The time required to back-calculate an aggregate depends upon how much new data is available; the more data needs to be processed, the longer back-calculation takes. Generally, at least one nightly or manual batch aggregate processing job is executed before the system can back-calculate aggregates. After back-calculation is complete, the system merges the back-calculation into its data. This happens automatically when the nightly Batch Aggregates processing job runs, or you can start the merge manually by clicking the Batch Aggregates job's Run Now button.

Figure 9:
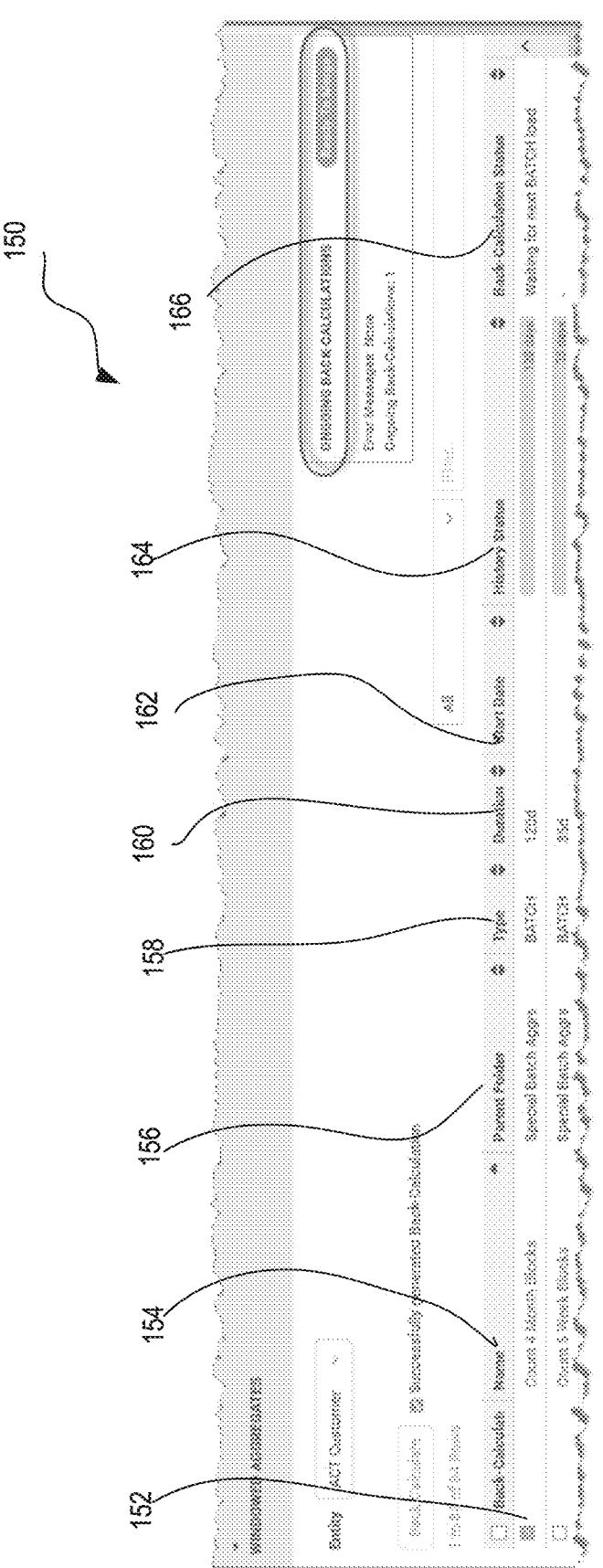
FIG. 9 is an exemplary user interface for back calculation

A Windowed Aggregate table is shown below in Table 9: The Windowed Aggregates table allows a user to choose aggregates via graphical user interface (see FIG. 9) for back-calculation, and provides the following information:

TABLE 9

| Column header and ref. no. | Description |
| --- | --- |
| Back Calculate 152 | Checkbox used to select the associated windowed aggregate for back-calculation. |
| Name 154 | The business name of the windowed aggregate. |
| Parent Folder 156 | The entity folder that the windowed aggregate is associated with. |
| Type 158 | The aggregate type, one of the following values:<br>RT—Real-time.<br>BATCH—Batch. |
| Duration 160 | The number of days of data needed to compute a full aggregate value. |
| Start Date 162 | The date when data collection began. |
| History Status 164 | The amount of data that Active > 360 has for a given windowed aggregate. If the bar is colored, e.g., with a green portion that indicates existing data. |
| Back-Calculation Status 166 | The status of any current or past back-calculation runs. |

A user selects aggregates for back-calculation in the Windowed Aggregates table GUI. In addition to choosing aggregates for back-calculation, the Windowed Aggregates table provides the above information: When the job has finished successfully, the Status column reads Success.

A number of embodiments have been described. Nevertheless, it will be understood that various modifications may be made without departing from the spirit and scope of the techniques described herein. For example, some of the steps described above may be order independent, and thus can be performed in an order different from that described. Additionally, any of the foregoing techniques described with regard to a dataflow graph can also be implemented and executed with regard to a program.

Example Computing Environment

Figure 10:
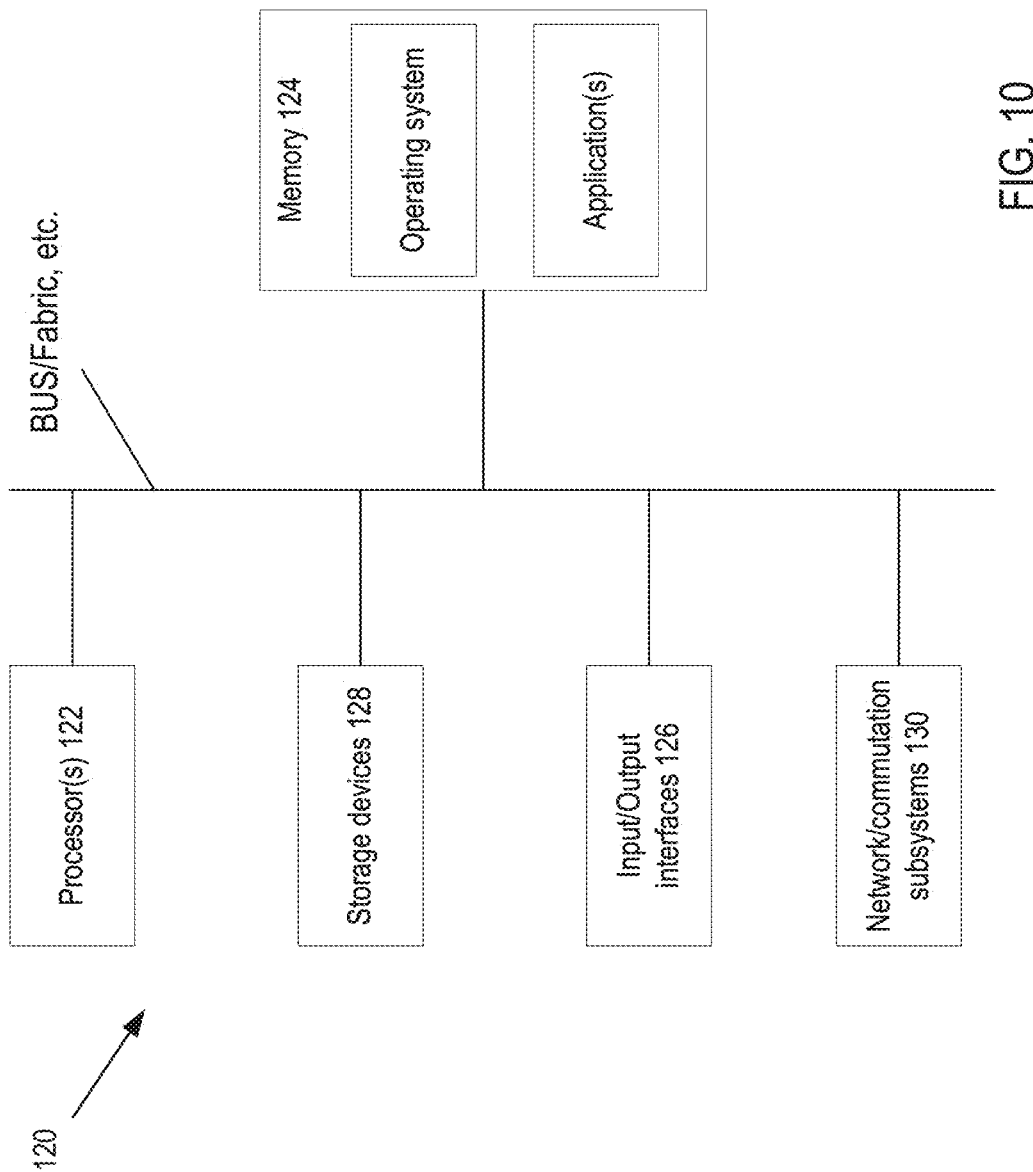
FIG. 10 is a diagram that depicts an exemplary computer system.

Referring to FIG. 10, an example operating environment for implementing embodiments of the present invention is shown and designated generally as computing device 120. Essential elements of a computing device 120 or a computer or data processing system or client or server are one or more programmable processors 122 (e.g., processor devices) for performing actions in accordance with instructions and one or more memory devices 124 for storing instructions and data, such as non-transitory computer readable storage devices. Generally, a computer will also include, or be operatively coupled, (via bus, fabric, network, etc.,) to I/O components 126, e.g., display devices, network/communication subsystems, etc. (not shown) and one or more mass storage devices 128, e.g., one or more non-transitory computer readable storage devices for storing data and instructions, etc., and a network communication subsystem 130, which are powered by a power supply (not shown). In memory device 124 are an operating system and applications for application programming.

Devices suitable for storing computer program instructions and data include all forms of non-volatile memory, media and memory devices including by way of example, semiconductor memory devices (e.g., EPROM, EEPROM, and flash memory devices), magnetic disks (e.g., internal hard disks or removable disks), magneto optical disks, and CD ROM and DVD-ROM disks. The processor and the memory can be supplemented by, or incorporated in, special purpose logic circuitry.

To provide for interaction with a user, embodiments of the subject matter described in this specification are implemented on a computer having a display device (monitor) for displaying information to the user and a keyboard, a pointing device, (e.g., a mouse or a trackball) by which the user can provide input to the computer. In addition, a computer can interact with a user by sending documents to and receiving documents from a device that is used by the user (for example, by sending web pages to a web browser on a user's client device in response to requests received from the web browser).

Embodiments of the subject matter described in this specification can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the subject matter described in this specification), or any combination of one or more such back end, middleware, or front end components. The components of the system can be interconnected by any form or medium of digital data communication (e.g., a communication network). Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments, and it should be understood that the described program components and systems can generally be integrated together in a single software product or packaged into multiple software products.

A number of embodiments have been described. Nevertheless, it will be understood that various modifications may be made without departing from the spirit and scope of the techniques described herein. For example, some of the steps described above may be order independent, and thus can be performed in an order different from that described. Additionally, any of the foregoing techniques described with regard to a dataflow graph can also be implemented and executed with regard to a program. Accordingly, other embodiments are within the scope of the following claims.

What is claimed is:

1. A method implemented by a data processing system for back-calculating one or more values of a near real-time aggregate over a period of time, with the back-calculating being before sufficient new data items are received to determine a value of the near real-time aggregate using the new data items, the method including:

starting execution by the data processing system of one or more instructions for generating a near real-time aggregate over a period of time that begins when the one or more instructions start execution, with the near real-time aggregate being based on one or more events;

retrieving, from a data storage system, historical data collected from one or more previously executing instructions;

storing, in a data store, one or more items of the historical data representing the one or more events occurring over the period of time;

from time to time, receiving new data items by the data processing system, with a new data item being a data item received once execution of the one or more instructions starts;

storing, in the data store, one or more of the new data items identified as representing the one or more events; and until the data processing system is able to generate a value of the near real-time aggregate over the period of time that begins when the one or more instructions start execution using the new data items and not using the historical data, based on the one or more of the new data items and on the one or more items of the historical data, storing, in the data store, one or more values of the near real-time aggregate, with the or more values being accessible from the data store for retrieval as the execution of the one or more instructions continues;

wherein the one or more stored values provide for one or more values of the near real-time aggregate over the period of time that begins when the one or more instructions start execution and before the data processing system is able to generate a value of the near real-time aggregate over the period of time using the new data items and not using the historical data, whereby the one or more values that are based on the one or more of the new data items and on the one or more items of the historical data reduces an amount of time from when execution of the one or more instructions starts to when the one or more values of the near real-time aggregate are stored in the data store, wherein starting the execution of the one or more instructions for generating the near real-time aggregate over the period of time includes:

receiving, at a controller, a definition of the near real-time aggregate that newly defines the near real-time aggregate;

generating, by the controller, a signal for sending to a query generator to cause the query generator to query the data storage system; and causing, by the query generator based on the signal, the retrieving, from the data storage system, of the historical data collected from one or more previously executing instructions, the historical data representing the one or more events occurring over the period of time for generation of the near real-time aggregate, wherein generating, by the controller, the signal for the query generator to cause the query generator to query the data storage system includes:

specifying, in the signal, one or more event types for accessing from the data storage system, wherein causing the retrieving includes retrieving only events having the one or more event types from the data storage system, and wherein the events include the one or more events occurring over the period of time for generation of the near real-time aggregate.

2. The method of claim 1, further including:

generating a query to retrieve from an archive the historical data.

3. The method of claim 2, further including:

sending the historical data to a batch processing module.

4. The method of claim 3, further including:

sending the occurrences of one or more events to a real-time processing module.

5. The method of claim 4 wherein as the one or more instructions execute for a given day, decrementing one day's worth of historical data, and incrementing one day's worth of the occurrences of one or more events.

6. The method of claim 2 wherein the query includes a search key.

7. The method of claim 6 wherein the search key is a customer identifier.

8. The method of claim 2 wherein a collect module outputs to a batch module of an aggregate that is based on a given number of days of archived events and the batch module.

9. The method of claim 8 wherein the batch module executes a computation graph that accesses the archived events, sorts the archived events according to a key, filters the sorted archived events according to the given number of days of events, and stores the given number of days of events and updates the near real-time aggregate stored in memory.

10. The method of claim 1, wherein the retrieving, from the data storage system, of the historical data is performed by performing, once for generating the near real-time aggregate, batch retrieval of the historic data.

11. The method of claim 1, wherein the data storage system is a non-volatile data storage system.

12. The method of claim 1, wherein the one or more values of the near real-time aggregate are stored in a memory that is volatile memory.

13. The method of claim 1, wherein the aggregate is generated by executing the one or more instructions on one or more inputs;

wherein identifying the one or more occurrences in the historical data includes identifying, in the historical data, one or more items of the historical data representing one or more historical occurrences of the one or more events, with the one or more historical occurrences occurring over a historical period of time, with an amount of time specified by the historical period of time corresponding to an amount of time specified by the period of time;

wherein the method further includes:

inputting the identified one or more items of the historical data as the one or more inputs.

14. A data processing system for back-calculating one or more values of a near real-time aggregate over a period of time, with the back-calculating being before sufficient new data items are received to determine a value of the near real-time aggregate using the new data items, the data processing system including one or more processor devices and memory, with the data processing system including one or more processors configured to perform actions including:

starting execution by the data processing system of one or more instructions for generating a near real-time aggregate over a period of time that begins when the one or more instructions start execution, with the near real-time aggregate being based on one or more events;

retrieving, from a data storage system, historical data collected from one or more previously executing instructions;

storing, in a data store, one or more items of the historical data representing the one or more events occurring over the period of time;

from time to time, receiving new data items by the data processing system, with a new data item being a data item received once execution of the one or more instructions starts;

storing, in the data store, one or more of the new data items identified as representing the one or more events; and until the data processing system is able to generate a value of the near real-time aggregate over the period of time that begins when the one or more instructions start execution using the new data items and not using the historical data, based on the one or more of the new data items and on the one or more items of the historical data, storing, in the data store, one or more values of the near real-time aggregate, with the or more values being accessible from the data store for retrieval as the execution of the one or more instructions continues;

wherein the one or more stored values provide for one or more values of the near real-time aggregate over the period of time that begins when the one or more instructions start execution and before the data processing system is able to generate a value of the near real-time aggregate over the period of time using the new data items and not using the historical data, whereby the one or more values being based on the one or more of the new data items and on the one or more items of the historical data reduces an amount of time from when execution of the one or more instructions starts to when the one or more values of the near real-time aggregate are stored in the data store;

wherein starting the execution of the one or more instructions for generating the near real-time aggregate over the period of time includes:

receiving, at a controller, a definition of the near real-time aggregate that newly defines the near real-time aggregate;

generating, by the controller, a signal for sending to a query generator to cause the query generator to query the data storage system; and causing, by the query generator based on the signal, the retrieving, from the data storage system, of the historical data collected from one or more previously executing instructions, the historical data representing the one or more events occurring over the period of time for generation of the near real-time aggregate, wherein generating, by the controller, the signal for the query generator to cause the query generator to query the data storage system includes:

specifying, in the signal, one or more event types for accessing from the data storage system, wherein causing the retrieving includes retrieving only events having the one or more event types from the data storage system, and wherein the events include the one or more events occurring over the period of time for generation of the near real-time aggregate.

15. The data processing system of claim 14, further including:

generating a query to retrieve from an archive the historical data.

16. The data processing system of claim 15, further including:

sending the historical data to a batch processing module.

17. The data processing system of claim 16, further including:

sending the occurrences of one or more events to a real-time processing module.

18. The data processing system of claim 17 wherein as the one or more instructions execute for a given day, decrementing one day's worth of historical data, and incrementing one day's worth of the occurrences of one or more events.

19. The data processing system of claim 15 wherein the query includes a search key.

20. One or more non-transitory computer readable storage devices including instructions for back-calculating one or more values of a near real-time aggregate over a period of time, with the back-calculating being before sufficient new data items are received to determine a value of the near real-time aggregate using the new data items, the instructions causing a data processing system to perform actions including:

starting execution by the data processing system of one or more instructions for generating a near real-time aggregate over a period of time that begins when the one or more instructions start execution, with the near real-time aggregate being based on one or more events;

retrieving, from a data storage system, historical data collected from one or more previously executing instructions;

storing, in a data store, one or more items of the historical data representing the one or more events occurring over the period of time;

from time to time, receiving new data items by the data processing system, with a new data item being a data item received once execution of the one or more instructions starts;

storing, in the data store, one or more of the new data items identified as representing the one or more events; and until the data processing system is able to generate a value of the near real-time aggregate over the period of time that begins when the one or more instructions start execution using the new data items and not using the historical data, based on the one or more of the new data items and on the one or more items of the historical data, storing, in the data store, one or more values of the near real-time aggregate, with the or more values being accessible from the data store for retrieval as the execution of the one or more instructions continues;

wherein the one or more stored values provide for one or more values of the near real-time aggregate over the period of time that begins when the one or more instructions start execution and before the data processing system is able to generate a value of the near real-time aggregate over the period of time using the new data items and not using the historical data, whereby the one or more values being based on the one or more of the new data items and on the one or more items of the historical data reduces an amount of time from when execution of the one or more instructions starts to when the one or more values of the near real-time aggregate are stored in the data store, wherein starting the execution of the one or more instructions for generating the near real-time aggregate over the period of time includes:

receiving, at a controller, a definition of the near real-time aggregate that newly defines the near real-time aggregate;

generating, by the controller, a signal for sending to a query generator to cause the query generator to query the data storage system; and causing, by the query generator based on the signal, the retrieving, from the data storage system, of the historical data collected from one or more previously executing instructions, the historical data representing the one or more events occurring over the period of time for generation of the near real-time aggregate, wherein generating, by the controller, the signal for the query generator to cause the query generator to query the data storage system includes:

specifying, in the signal, one or more event types for accessing from the data storage system, wherein causing the retrieving includes retrieving only events having the one or more event types from the data storage system, and wherein the events include the one or more events occurring over the period of time for generation of the near real-time aggregate.

* * * * *